(12) United States Patent
Wang et al.

(10) Patent No.: US 12,513,679 B2
(45) Date of Patent: Dec. 30, 2025

(54) CRC SCRAMBLING FOR SCI IN NR SIDELINK

(71) Applicant: QUALCOMM Incorporated, San Diego, CA (US)

(72) Inventors: Xiaojie Wang, Hillsborough, NJ (US); Jing Sun, San Diego, CA (US); Piyush Gupta, Bridgewater, NJ (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 17/401,041

(22) Filed: Aug. 12, 2021

(65) Prior Publication Data

US 2022/0070869 A1 Mar. 3, 2022

Related U.S. Application Data

(60) Provisional application No. 63/070,138, filed on Aug. 25, 2020.

(51) Int. Cl.
| | |
|---|---|
| *H04L 5/00* | (2006.01) |
| *H04L 1/00* | (2006.01) |
| *H04W 72/044* | (2023.01) |
| *H04W 72/1263* | (2023.01) |
| *H04W 72/20* | (2023.01) |

(52) U.S. Cl.
CPC ....... *H04W 72/0466* (2013.01); *H04L 1/0061* (2013.01); *H04L 5/0044* (2013.01); *H04W 72/1263* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 2012/0182980 | A1* | 7/2012 | Abraham | H04L 1/0061 370/328 |
| 2017/0127316 | A1* | 5/2017 | Chen | H04W 72/20 |
| 2018/0062809 | A1* | 3/2018 | Baghel | H04L 1/0061 |
| 2022/0110143 | A1* | 4/2022 | Ganesan | H04W 72/20 |

FOREIGN PATENT DOCUMENTS

| | | | | |
|---|---|---|---|---|
| WO | WO-2016159845 | A1 * | 10/2016 | |
| WO | WO2020145662 | A1 * | 7/2020 | H04L 27/2613 |

* cited by examiner

*Primary Examiner* — Abdelillah Elmejjarmi
(74) *Attorney, Agent, or Firm* — QUALCOMM Incorporated

(57) ABSTRACT

This disclosure provides systems, devices, apparatus, and methods, including computer programs encoded on storage media, for CRC scrambling for SCI in sidelink communication. A wireless transmitter may be configured to scramble bits of SCI based on a scrambling sequence and transmit the SCI to a wireless receiver. The wireless receiver may receive the SCI having CRC bits scrambled with the scrambling sequence and attempt to decode the SCI, including descrambling the CRC bits of the SCI. The SCI may include a first portion of SCI transmitted in a PSCCH and a second portion of SCI transmitted in a PSSCH.

26 Claims, 12 Drawing Sheets

CRC SCRAMBLING FOR SCI IN NR SIDELINK

CROSS REFERENCE TO RELATED APPLICATION(S)

This application claims the benefit of and priority to U.S. Provisional Application Ser. No. 63/070,138, entitled "CRC Scrambling for SCI in NR Sidelink" and filed on Aug. 25, 2020, which is expressly incorporated by reference herein in its entirety.

TECHNICAL FIELD

The present disclosure relates generally to communication systems, and more particularly, to cyclic redundancy check (CRC) scrambling for sidelink control information (SCI) in sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless transmitter that includes a memory and at least one processor coupled to the memory. The memory may include instructions that, when executed by the at least one processor, cause the at least one processor to receive SCI having CRC bits scrambled with a scrambling sequence; and attempt to decode the SCI including descrambling the CRC bits of the SCI.

In an aspect of the disclosure, a method, a computer-readable medium, and an apparatus are provided. The apparatus may be a wireless receiver that includes a memory and at least one processor coupled to the memory. The memory may include instructions that, when executed by the at least one processor, cause the at least one processor to scramble CRC bits of SCI based on a scrambling sequence; and transmit the SCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
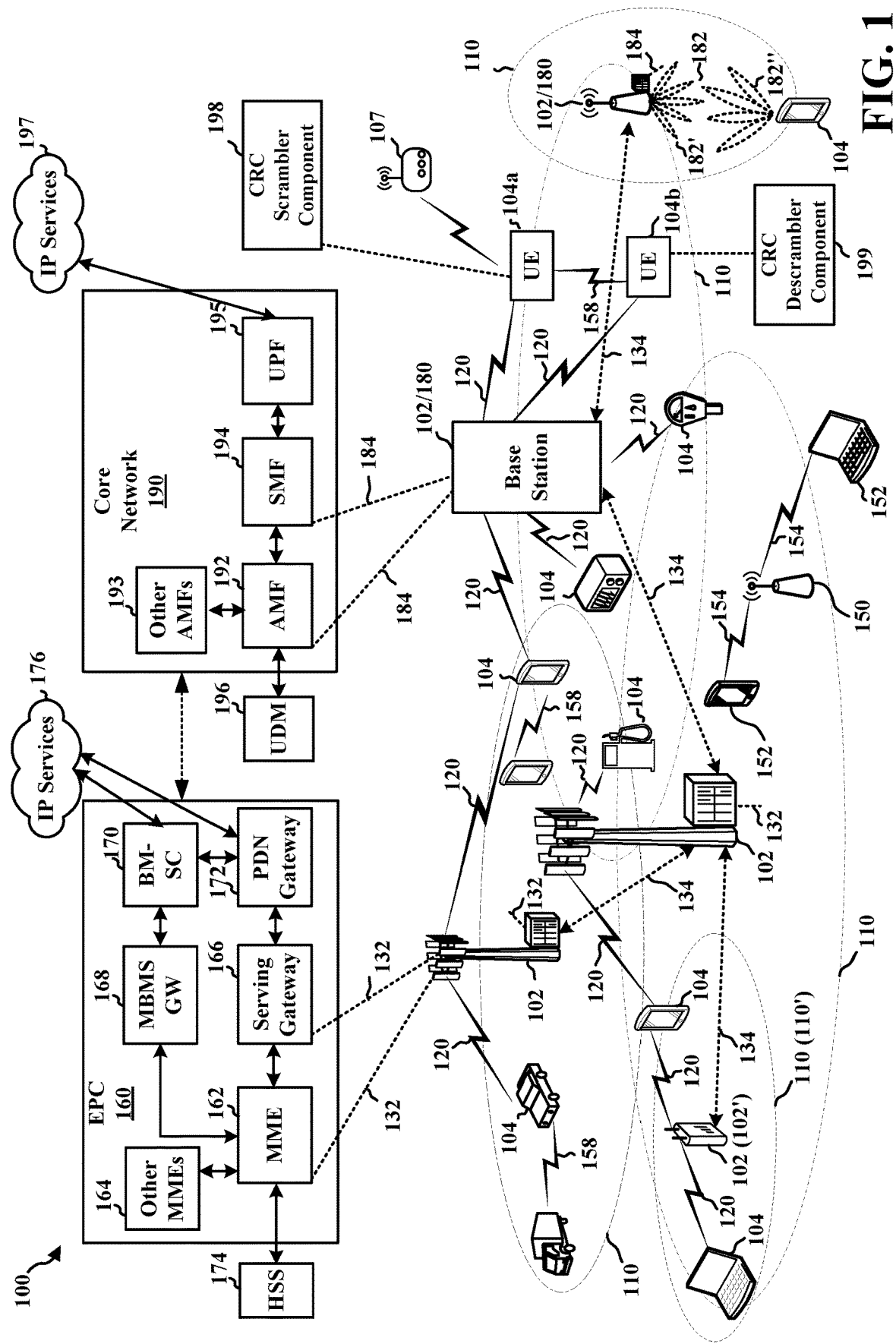
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

While some sidelink communications may be associated with sidelink user equipments (UEs) that are homogenous (e.g., the UE capability is the same for both the transmitter UE and the receiver UE), other sidelink communications may be associated with UEs that are heterogeneous (e.g., the UE capability is not the same for both the transmitter UE and the receiver UE). Sidelink control information (SCI) may include first stage SCI (SCI 1) and second stage SCI (SCI 2). In some examples, a sidelink UE may skip an SCI 2 decoding attempt (e.g., if an SCI 1 decoding attempt failed) in order to provide a power savings for the sidelink UE. However, source IDs and destination IDs for sidelink communication may be included in the skipped SCI 2 decoding in certain configurations.

CRC scrambling may be utilized for SCI 2 if an anchor does not have to receive SCI 1 from unrelated clients/anchors and/or if a client does not have to receive SCI 1 from unrelated anchors/clients. Accordingly, for CRC scrambling of SCI 1 and SCI 2 in sidelink communications, a two-stage CRC scrambling technique may be used for the SCI 1 and the SCI 2 for providing both the source ID and the destination ID to the sidelink UEs, rather than a single radio network temporary identifier (RNTI) in a Uu link. As such, the power savings for not attempting to decode the SCI 2 (e.g., if the SCI 1 decoding fails) may still be provided for the UE. A first stage of the two-stage CRC scrambling technique may be for CRC scrambling of SCI 1. A second stage of the two-stage CRC scrambling technique may be for CRC scrambling of SCI 2.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104a (e.g., a transmitter UE), or other device communicating based on sidelink, may include a cyclic redundancy check (CRC) scrambler component 198 configured to scramble CRC bits of sidelink control information (SCI) based on a scrambling sequence; and transmit the SCI. In further aspects, a UE 104b (e.g., a receiver UE), or other device communicating based on sidelink, may include a CRC descrambler component 199 configured to receive SCI having CRC bits scrambled with a scrambling sequence; and attempt to decode the SCI including descrambling the CRC bits of the SCI.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
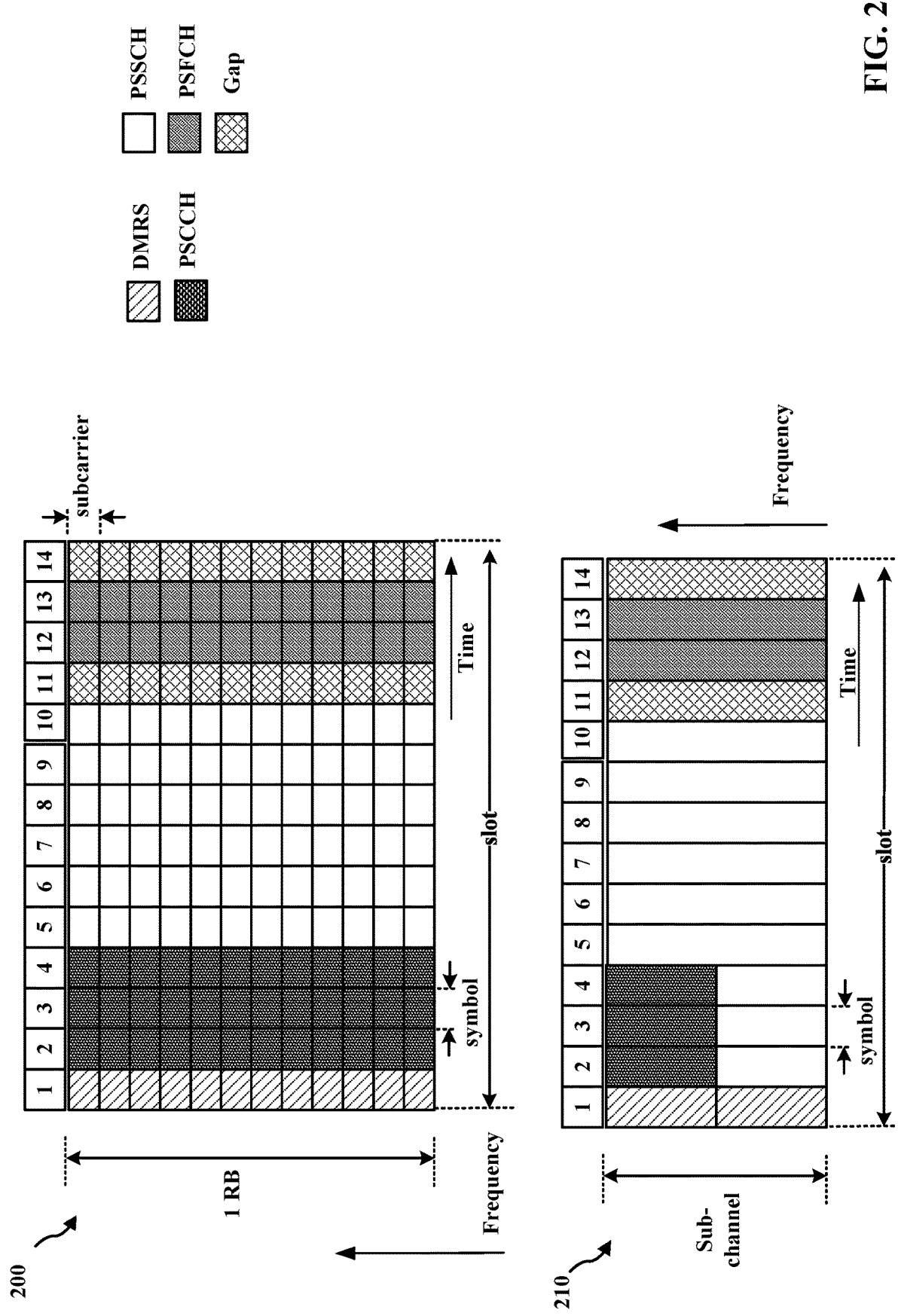
FIG. 2 illustrates example aspects of a sidelink slot structure.

FIG. 2 illustrates example diagrams 200 and 210 illustrating example aspects of slot structures that may be used for sidelink communication (e.g., between UEs 104, RSU 107, etc.). The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A subchannel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
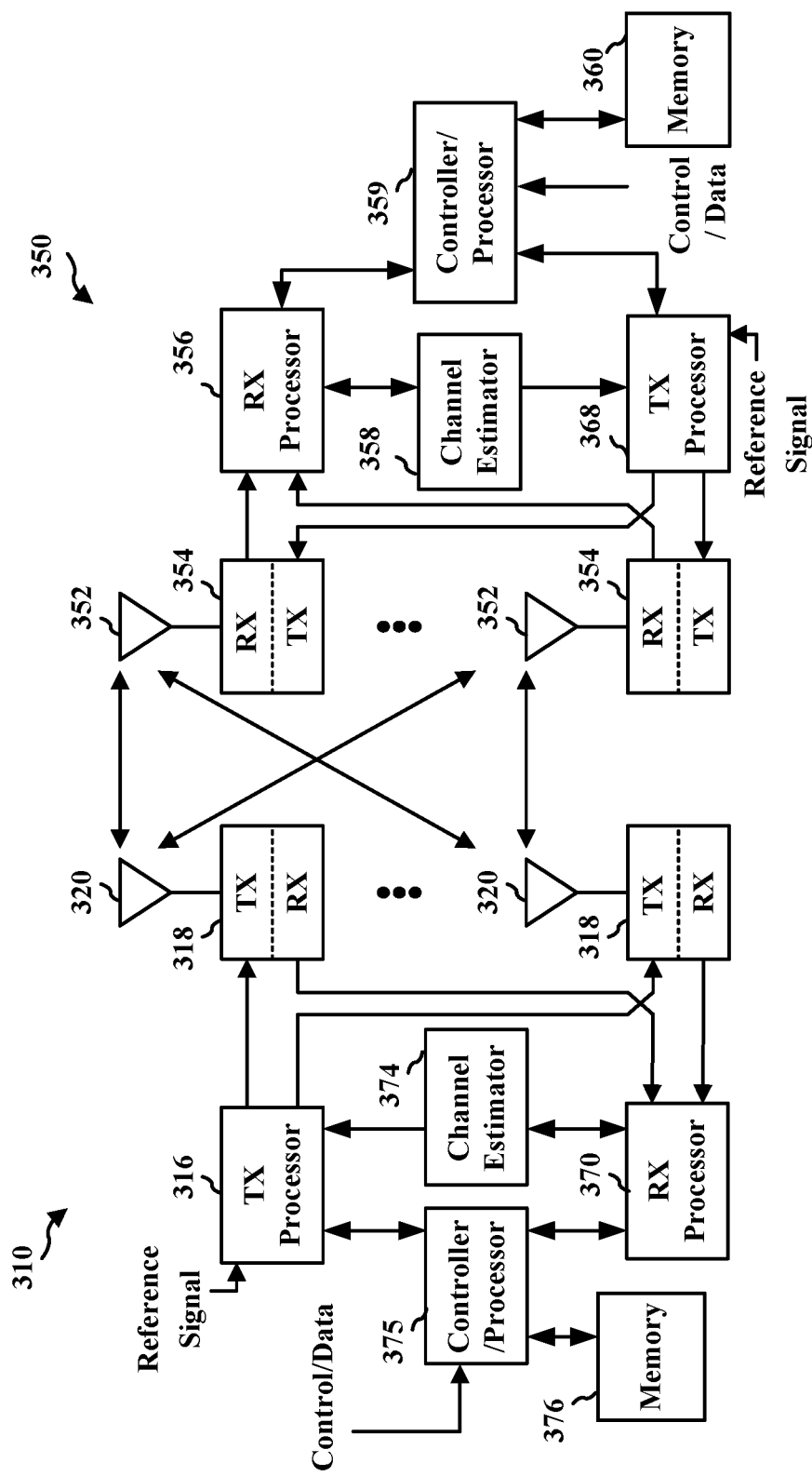
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an acknowledgment (ACK) and/or negative-acknowledgment (NACK) protocol to support hybrid automatic repeat request (HARQ) operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the CRC scrambler component 198 of FIG. 1.

At least one of the TX processor 316, the RX processor 370, and the controller/processor 375 may be configured to perform aspects in connection with the CRC descrambler component 199 of FIG. 1.

Figure 4:
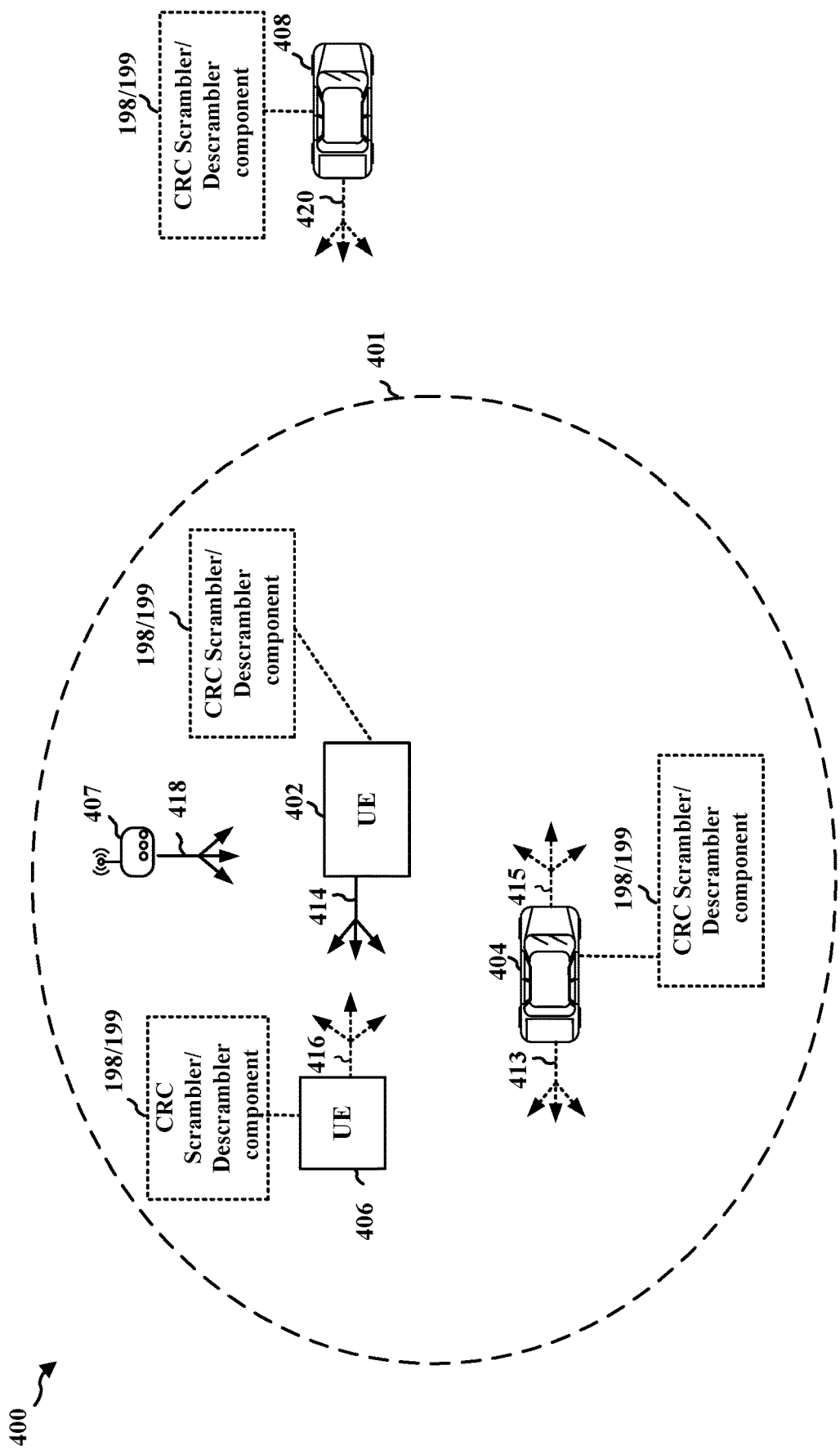
FIG. 4 illustrates a diagram for wireless communication between devices based on sidelink communication.

FIG. 4 illustrates an example diagram 400 of wireless communication between devices based on sidelink communication. The communication may be based on a slot structure comprising aspects described in connection with FIG. 2. For example, a transmitting UE 402 may transmit a transmission 414, e.g., comprising a control channel and/or a corresponding data channel, that may be received by receiving UEs 404, 406, 408. A control channel may include information for decoding a data channel and may also be used by a receiving device to reduce interference by refraining from transmitting on the occupied resources during a data transmission. The number of TTIs, as well as the RBs occupied by the data transmission, may be indicated in a control message from the transmitting device. The UEs 402, 404, 406, 408 may each be configured to operate as a transmitting device in addition to operating as a receiving device. Thus, UEs 402, 406, 408 are illustrated as transmitting a transmission 413, 414, 415, 416, 420. The transmissions 413, 414, 415, 416, 420 may be broadcast or multicast to nearby devices. For example, the UE 402 may transmit a communication intended for receipt by other UEs within a range 401 of the UE 402. Additionally or alternatively, RSU 407 may receive communication from and/or transmit communication 418 to the UEs 402, 404, 406, 408.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission.

Figure 5B:
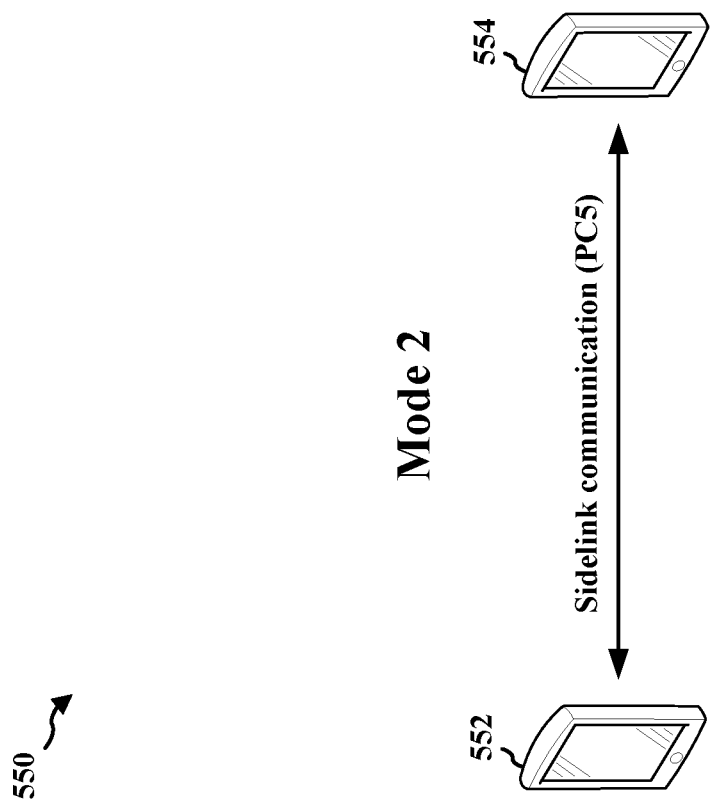
FIGS. 5A-5B illustrate diagrams for modes of resource allocation.
Figure 5A:
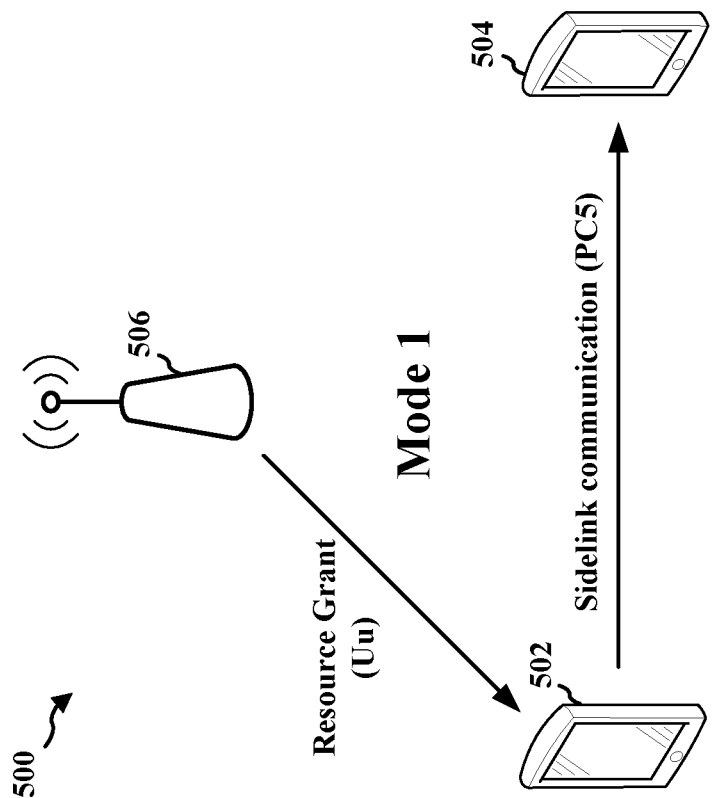

FIGS. 5A-5B illustrate diagrams 500 and 550 for modes of resource allocation. Sidelink communications may utilize two modes of operation for resource selection/allocation. In mode 1, shown in diagram 500, a base station 506 may indicate, to a wireless transmitter 502 (e.g., via a Uu link), a wireless receiver 504 that is to receive information over sidelink (e.g., via a PC5 interface). SCI transmitted via mode 1 may be assigned by the base station 506 based on a frequency domain resource allocation (FDRA) field and/or a time domain resource allocation (TDRA) field.

In mode 2, shown in diagram 550, the wireless transmitter 552 may select the FDRA field and the TDRA field for the wireless receiver 554, which may not be used for sidelink communications of other UEs. Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s). In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots.

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Thus, the wireless transmitter 552 may be configured to monitor for all SCI, regardless of whether detected traffic is intended for the wireless transmitter 552. That is, the wireless transmitter 552 may be configured to decode all detected SCI to determine which resources are reserved for other UEs and which resources may be reserved for the wireless transmitter 552 to transmit traffic to the wireless receiver 554.

In some examples, sidelink communications may be based on a single format for first stage SCI (SCI 1). The first stage SCI may be transmitted on a PSCCH, whereas a second stage SCI (SCI 2) may be transmitted on a PSSCH. The format may be SCI 1-A, which may be indicated via PSCCH. SCI 1 may include a plurality of fields that indicate a priority of traffic transmitted to the wireless receiver (504/554), resources for decoding a data channel (e.g., PSSCH), etc. The plurality of fields may include priority bits (e.g., 3 bits), a frequency resource assignment where the bits may depend on a number of slot reservations and a number of subchannels, a time resource assignment where, e.g., 5 or 9 bits may be used for 2 or 3 reservations, a resource reservation period where the bits may depend on a number of allowed periods and indicate to the wireless receiver (504/554) a length of the FDRA reservation and/or the TDRA reservation, etc. The FDRA field and the TDRA field may be used by the wireless receiver (504/554) for identifying the PSSCH. Thus, SCI 1 may be used for providing an indication to sidelink UEs to decode the FDRA field and the TDRA field, such that the UEs may determine available sidelink resources in a resource pool.

Other fields associated with the plurality of fields may include a DMRS pattern where the bits may depend on a number of configured patterns, a second stage SCI (SCI 2) format (e.g., 2 bits), a beta offset for SCI 2 rate matching (e.g., 2 bits), a DMRS port having, e.g., 1 bit indicating one or two data layers, a modulation and coding scheme (MCS) (e.g., 5 bits), an additional MCS table (e.g., 0-2 bits), a physical sidelink feedback channel (PSFCH) overhead indicator (e.g., 0 or 1 bit), and reserved bits for an upper layer. The bits may be decoded by an intended wireless receiver (504/554) and other sidelink UEs (e.g., in mode 2) to provide increased channel sensing and decreased resource collision. CRC may be performed for SCI 1. For example, bits determined by the upper layers may have a 24-bit CRC appended to the SCI 1 for transmission through the PSCCH.

The SCI 2 may be transmitted based on the data channel (e.g., PSSCH). SCI 2 in PSSCH may be front-loaded, where the fields may include link level parameters such as a HARQ identifier (ID) where the bits may depend on a number of HARQ processes, a HARQ enabled/disabled parameter (e.g., 1 bit), a redundancy version (RV) ID (e.g., 2 bits), a new data indicator (NDI) (e.g., 1 bit), etc. The SCI 2 may also indicate, to the wireless receiver (504/554), a transmitter/source ID (e.g., 8 bits) and a destination ID (e.g., 16 bits). In examples, sidelink UEs may decode both SCI 1 and SCI 2. The destination ID and the source ID may be included in the SCI 2. Thus, in some cases, without decoding the SCI 2 the wireless receiver (504/554) may be unable to determine whether a detected message is for the wireless receiver (504/554).

SCI 2 may be associated with two formats that include SCI 2-A and SCI 2-B. The SCI 2-A field may include a CSI request (e.g., 1 bit) or a cast type field (e.g., 2 bits), such as broadcast, groupcast, or unicast. The SCI 2-B field may be for NACK-only groupcast and may include fields such as zone ID (e.g., 12 bits) or communication range (e.g., 4 bits). SCI 2 may be intended for receivers that are to decode the PSSCH. In examples, SCI 2 may be skipped by a sidelink UE, if the sidelink UE is not intending to receive any packets. However, if the sidelink UE is intending to receive a sidelink transmission, the sidelink UE may decode both SCI 1 and SCI 2. After the SCI 2 fields are determined by the sidelink UE, a 24-bit CRC may be appended to the SCI 2.

Figure 6:
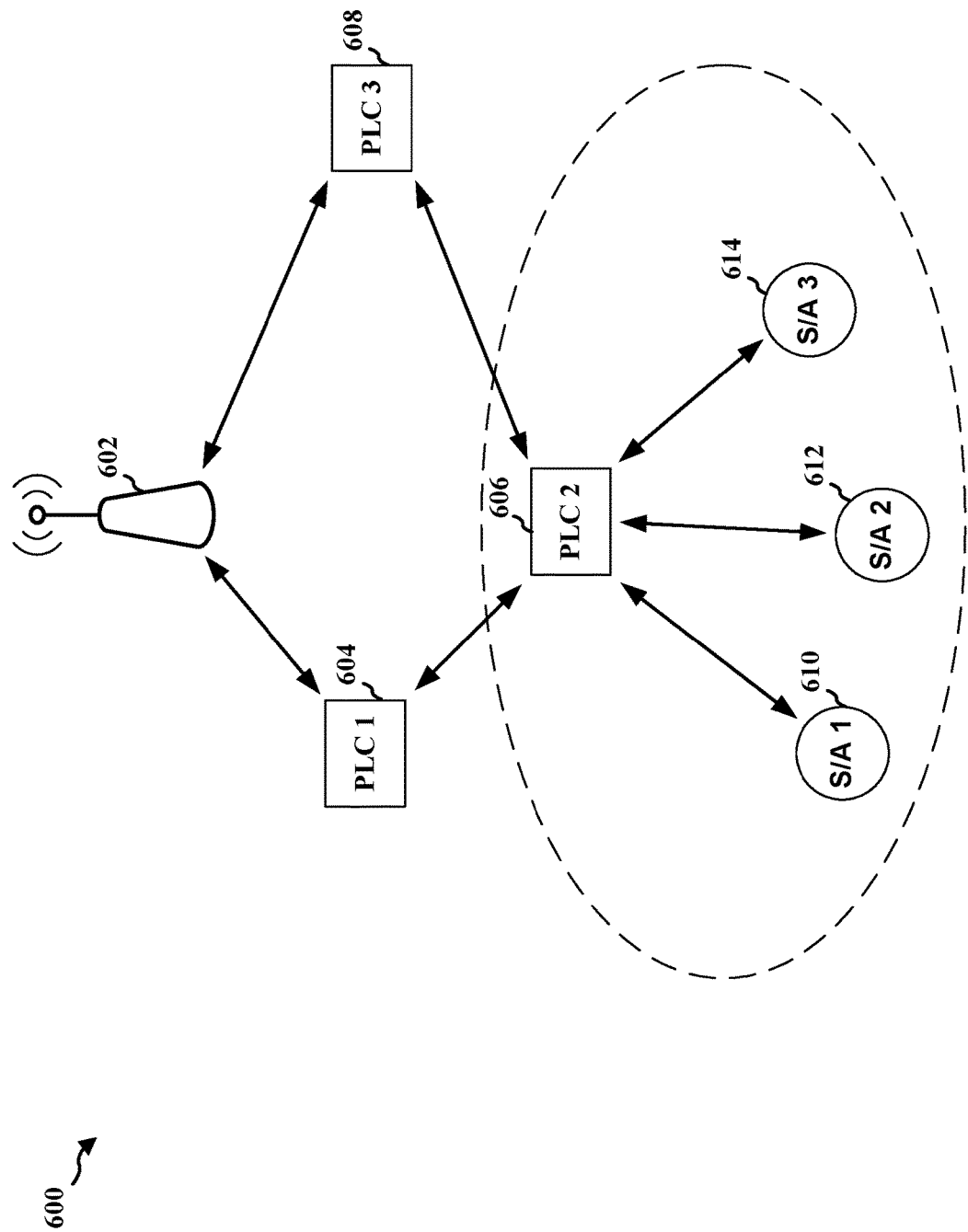
FIG. 6 is a diagram associated with cyclic redundancy check (CRC) scrambling for sidelink control information (SCI).

FIG. 6 is a diagram 600 associated with CRC scrambling for SCI. While some D2D communications may be associated with sidelink UEs that are homogenous (e.g., the UE capability is the same for both the transmitter and the receiver), other D2D communications may be associated with heterogeneous UEs (e.g., the UE capability is not the same for both the transmitter and the receiver). Further, SCI 1 may not be scrambled in some cases by CRC given that SCI 1 may be intended for all sidelink UEs. Therefore, CRC may be determined from the content of the SCI 1 with no scrambling operation applied to the SCI 1. Such aspects may be in contrast, for example, to a PDCCH that may have the CRC scrambled by a 16-bit radio network temporary identifier (RNTI), where the RNTI may indicate to the receiver a purpose of the control information (e.g., paging, dynamic grant, or other purpose). In sidelink communications, however, the SCI 1 and/or the SCI 2 may not be configured for CRC scrambling in some instances. SCI 2 decoding may be attempted after a successful SCI 1 decoding. By skipping the SCI 2 decoding attempt, a power savings may be provided if the SCI 1 includes certain information about the wireless receiver. Nevertheless, all of the source IDs and the destination IDs may be included in the SCI 2 in certain configurations.

In some instances, CRC scrambling of SCI may be performed. For example, in mode 1 a base station 602 may control resource usage such that not all UEs may have to monitor for SCI 1. In industrial IoT (IIoT), UE devices may be heterogenous devices. Programmable logic controllers (PLCs) and sensors/actuators (S/As) may have different processing and/or power capabilities. A PLC may have increased capabilities in comparison to a S/A in IIoT. For example, a PLC (e.g., PLCs 604, 606, and 608) may be a centralized unit configured to control, e.g., 20-50 different S/As, which may include the S/As 610, 612, and 614. The S/As 610-614 may be configured to communicate with a specific PLC, such as the PLC 606. Communication and coordination among the PLCs 604-608 may also be performed for sidelink communications, even though decoding of messages between the PLCs 604-608 may not be performed for communication with the different S/As 610-614. For example, while the S/A 612 may receive information from the PLC 606, the S/A 612 may not have to decode messages among the PLCs 604-608 or message to S/As that are outside the group that includes the PLC 606.

An anchor/client model may be associated, e.g., with a mode 1.5, where the anchor/PLC may perform resource/interference management operations. For mode 1.5, the PLC 606 may correspond to an anchor having increased processing capability, while the client may correspond to the S/As 610-614 having decreased processing capabilities. The anchor/client model may be different from mode 1 where the PLC 606 may be controlled by the base station 602, and different from mode 2 where the PLC 606 may determine resources to be used for sidelink communication with the S/As 610-614. In the anchor/client model, the PLC 606 may operate in either mode 1 or mode 2 but may include increased processing capabilities for resource scheduling and resource reservation, while the S/As 610-614 may include decreased processing capabilities and may operate based on instructions received from the PLC 606. Thus, the anchor may be a "high-end" UE configured to control/schedule multiple "low-end" clients. Anchor-to-anchor SCI information may provide inter-anchor coordination. However, clients may not have to decode the SCI 1 or the SCI 2. For instance, if SCI 1 fails, the client may conserve power by skipping SCI 2 decoding. If CRC scrambling is utilized for SCI 1, which may be configured for decoding by the PLCs 604-608, the CRC may fail to be decoded by the S/As 610-614 if the S/As 610-614 attempt to decode the SCI 1 and cause the S/As 610-614 to skip SCI 2 decoding and save power.

CRC scrambling may be utilized for SCI if an anchor does not have to receive SCI 1 from unrelated clients/anchors and/or if a client does not have to receive SCI 1 from unrelated anchors/clients. The source ID and the destination ID included in the SCI 2 may have 24 bits (e.g., 8 bits for the source ID and 16 bits for the destination ID). If the bits for the source ID and the destination ID (or other fields such as cast type, RV-ID, etc.) are scrambled based on the CRC, the UE may determine the source ID, the destination ID, the cast type, the RV-ID, etc., from the CRC scrambling for providing a smaller payload size for the SCI 2. Accordingly, for CRC scrambling of SCI 1 and SCI 2 in sidelink, a two-stage CRC scrambling technique may be used that may be based on both the source ID and the destination ID, rather than a single RNTI in the Uu link. A power savings may be provided by not attempting to decode the SCI 2 if SCI 1 decoding has failed.

A first stage of the two-stage CRC scrambling technique may be for CRC scrambling of SCI 1. SCI 1 may include a CRC (e.g., $CRC_{SCI1}$) of 24 bits, a source ID ($P_{ID}$) of 8 bits, a (group) destination ID ($M_{ID}$) of 16 bits, and/or a cast type ($O_{cast}$) of 2 bits. The CRC for SCI 1 may be scrambled based on an exclusive-or (XOR) operation with another 24-bits sequence. The scrambling may be provided via a combination of the source ID, the destination ID, and in some cases, cast type and other indications transmitted in SCI 1 or SCI 2 in the PSSCH data channel (e.g., whether a grant is for semi-persistent scheduling (SPS) traffic, anchor/client category information, etc.). In the Uu interface, DCI may be transmitted in PDCCH and may be CRC scrambled based on a 16-bit RNTI. Similar scrambling may be performed in the sidelink based on the source ID, the destination ID, two-stage SCI, etc. CRC scrambling in the sidelink may provide a power savings, as the UE may not have to decode SCI 2, if SCI 1 CRC has failed. Given that IDs and cast type may be determined from SCI 1 CRC, SCI 2 overhead may be reduced by not having to derive the IDs or the cast type from the SCI 2.

Any 24-bit combination of the source ID, the destination ID, and other fields may be used for CRC scrambling. In a first example, a new CRC ID ($N_{ID}$) may be scrambled based on 24 bits. The $N_{ID}$ may be any 24 bits determined from the source ID ($P_{ID}$) and the destination ID ($M_{ID}$) along with the cast type ($O_{CAST}$) included in the SCI 2 (e.g., $CRC_{SCI1} \oplus N_{ID}$, where $\oplus$ corresponds to XOR). Cast type may include 2 bits that are indicative of unicast, groupcast, or broadcast. For unicast, the cast type may not be indicated, as the destination ID may indicate a destination of a specific receiver. Thus, scrambling may be based on the source ID and the destination ID (e.g., $N_{ID}2^8 M_{ID}+P_{ID}$ or $N_{ID}=2^{16}P_{ID}+M_{ID}$). For groupcast, the source ID may be 8 bits and the destination ID may be associated with a group ID. Thus, scrambling may be based on the source ID and the group ID (e.g., $N_{ID}=2^8 M'_{ID}+P_{ID}$, where $M'_{ID}$ may be determined via the $O_{cast}$ plus bits of the group ID). Since some bits in the group ID may be less important for determining the group ID, such bits may be replaced with cast type so the receiver may determine a groupcast configuration having a certain ID. For broadcast, the source ID and cast type may be included in the scrambling sequence, as the destination ID may not be indicated for broadcasting. Thus, scrambling may be based on the source ID (e.g., $N_{ID}=2^8 M'_{ID}+P_{ID}$, where $M'_{ID}$ may be determined via the $O_{cast}$ plus bits of the destination ID). In aspects, the UE may decode SCI from a first node to a second node or group of nodes having a specific cast type. In this manner, the UE may be more selective in determining the SCI to decode.

In a second example, the CRC may be scrambled by 8 bits associated with the source ID or 16 bits associated with an assisting ID/specific ID of the transmitter, or a configured ID. The 8-bit ID included in SCI 2 may be shortened in the physical layer. In a higher layer, each sidelink UE may be identified based on a 24-bit ID. The 16-bit ID, the 24-bit ID, or the configured ID may be limited based on the 24-bit allocation. 8 or 16 (pre)configured CRC bits may be selected for an XOR operation. The UE may decode SCI 1 from a specific source and, in examples, use a 10-bit or an 18-bit scrambling sequence along with the cast type, if the UE is expecting information from a node based on the specific cast type.

In a third example, the destination ID may be utilized with the cast type so that the receiver may be selective in determining the destination ID for decoding the SCI 1. The new CRC may be scrambled by an 18-bit combination of cast type (e.g., 2 bits) and the destination ID or by the destination ID alone. 18 or 16 (pre)configured CRC bits may be selected for the XOR operation. The UE may decode SCI 1 for a specific destination with or without a specific cast type.

If the destination ID, the source ID, and other fields are used to scramble the CRC (e.g., first stage CRC scrambling), the receiver may determine the source ID and the destination ID from decoding the SCI 1. A payload size of the SCI 2 may be reduced if the fields are determined from the SCI 1 CRC. In a first aspect, the source ID, the destination ID, and/or the cast type may be omitted in the SCI 2 to provide a savings of 8/10, 14/16/18, or 24/26 bits, depending on the fields used for the SCI 1 scrambling. Since the payload size of the SCI 2 may be indicated to the receiver, an updated SCI 2 format may be used or an SCI 2 format indicator may remain the same as in the SCI 1 in some cases. The payload size may be determined from CRC scrambling. If the CRC scrambling for SCI 1 is scrambled by the destination ID, the receiver may determine, for example, that the SCI 2 payload size is reduced by 8 bits. SCI 2 format "00" may indicate a payload size of 34 bits. If SCI 1 CRC is scrambled by both the source ID and the destination ID, the payload size may be reduced by 10 bits.

In a second aspect, a source ID, a destination ID, and/or cast type may be reinterpreted. That is, the fields for the source ID and the destination ID may be repurposed to signal other information. In such cases, the signaled other information may be used with the SCI 2 format if the size of the SCI 2 format remains the same.

In a third aspect, SCI 2 may include a source ID field and a destination ID field. The source ID and the destination ID may be included in SCI 2 for the receiver to verify both IDs in the SCI 2 and for CRC scrambling to reduce an error probability, so that the content may be compared with the CRC scrambling and the SCI 2. If the IDs of the content and the CRC scrambling do not match, an SCI 1 or SCI 2 decoding error may be determined. Additionally or alternatively, the source ID included in the SCI 2 may be different from the source ID used for SCI 1 CRC scrambling. The source ID indicated in the SCI 1 may be used to indicate the transmitter/receiver IDs. In SCI 2, the source ID may correspond to the source of a relaying node (e.g., a relaying node ID), such that the receiver may determine that a link between the transmitter and the receiver is degraded and that the receiver may be receiving a message from the relaying node.

A second stage of the two-stage CRC scrambling technique may be for CRC scrambling of SCI 2. SCI 2 CRC may also be 24 bits and scrambled based on a 24-bit sequence, particularly if the SCI 1 is scrambled by a combination of the source ID, the destination ID, the cast type, and/or the other fields. Such techniques may be performed to utilize 2×24 bits for performing CRC scrambling and signaling more control information. In examples, if the SCI 1 is scrambled by the source ID, the SCI 2 may be scrambled by the destination ID. Further, the SCI 1 may be scrambled by a first subset of fields, while the SCI 2 may be scrambled by a second subset of fields to provide a potential savings of bits in the SCI 2. If the SCI 1 is not scrambled, the control information may be indicated to all the sidelink UEs and SCI 2 may be scrambled by a combination of the source ID, destination ID, cast type, and/or other fields. If the UE successfully decodes SCI 1 but does not successfully decode SCI 2, a savings of up to 26 bits may be provided via the SCI 2.

If SCI 1 is scrambled based on the source ID, other fields such as the destination ID and/or the cast type may be determined for scrambling the SCI 2, thereby providing the two-stage CRC scrambling. The UE may decode SCI 1 from a specific source. For example, the S/As 610-614 may decode SCI 1 from the connected PLC 606 based on the S/As 610-614 being connected via higher layer to the PLC 606. Since the S/As 610-614 may communicate with the PLC 606, the S/As 610-614 may not decode all available SCI information. The S/As 610-614 may simply decode SCI 1 from a specific node (e.g., the PLC 606), which may provide a need for SCI 2 to be scrambled, e.g., by the destination ID. Accordingly, SCI 2 decoding may be performed for a specific (group) destination ID (e.g., if mode 1.5 is used), where the S/As 610-614 are to receive traffic from the specific PLC 606.

In aspects, SCI 1 CRC may be scrambled by the destination ID and SCI 2 CRC may be scrambled by the source ID, the destination ID, and/or the cast type. The UE may decode SCI 1 for a specific UE/group of UEs. However, PSSCH decoding may be performed if the traffic is from a certain source. In examples, the PSSCH may be decoded if SCI 2 is scrambled by the source ID and both CRCs for SCI 1 and SCI 2 are verified. A determination for CRC scrambling of SCI 1 and SCI 2 may be different in the forward link (e.g., from the PLC 606 to the S/As 610-614) than in the reserve link (e.g., from the S/As 610-614 to the PLC 606). SCI 1 may be scrambled by a PLC ID for both the forward link and the reserve link, rather than by the source ID, to reduce CRC scrambling at the PLC 606. In the forward link, where the SCI 1 may be scrambled by the PLC source ID, the S/As 610-614 may monitor for traffic from the specific PLC 606. In the reverse link, the PLC 606 may become the receiver, such that the PLC 606 may monitor for SCI from the S/As 610-614. Since the SCI 1 may be scrambled by the PLC destination ID, the PLC 606 may monitor for the SCI 1 that is scrambled by the ID of the PLC 606. The PLC 606 may perform CRC scrambling based on the IDs of the S/As 610-614, although complexities at the PLC 606 may be unnecessarily increased based on such techniques.

Two-stage CRC scrambling for SCI may be based on 2×24 bits for the CRC. That is, both SCI 1 and SCI 2 may have 24-bit CRCs associated with independent fields. SCI 1 may be scrambled based on a first combination of a first set of the source ID, destination ID, cast type, etc. SCI 2 may be scrambled based on a second combination of a second set of the source ID, destination ID, cast type, etc. The IDs may be layer 1 (L1) or layer 2 (L2) IDs or other upper layer IDs.

For providing relaying support, a first set of IDs may indicate an initial Tx/Rx ID and a second set of IDs may indicate a relay/Rx ID. Multi-hop relaying may be associated with further relaying IDs. For example, multi-hop relaying may be used for vehicle platooning (e.g., associated with V2X), where platoon members may relay messages from a platoon leader or other members. In aspects, SCI 1 and SCI 2 may be received by separate signaling recipients. CRC scrambling for SCI 1 may indicate a groupcast having a group destination ID, while SCI 2 may indicate a unicast and a receiver node ID for a specific UE in the group. If the PLC 606 transmits a message to the S/A 612, the SCI 2 may indicate that the receiver is the S/A 612. In SCI 1, the CRC scrambling may indicate that all the S/As 610-614 are to decode the control information in the SCI 1. The S/As 610-614 may monitor for SCI 1 scrambled by the group ID to receive groupcast and unicast traffic.

A hybrid switching may be performed based on an upper layer signal that indicates whether relaying is to be associated with the two-stage CRC scrambling. If the PLC 606 indicates that relaying is not to be performed, operations may be switched to have the source ID and the destination ID point to one transmitter and one receiver. An SCI 2 format or upper layer signaling may be used to configure a same or a different first set of IDs and second set of IDs.

Figure 7:
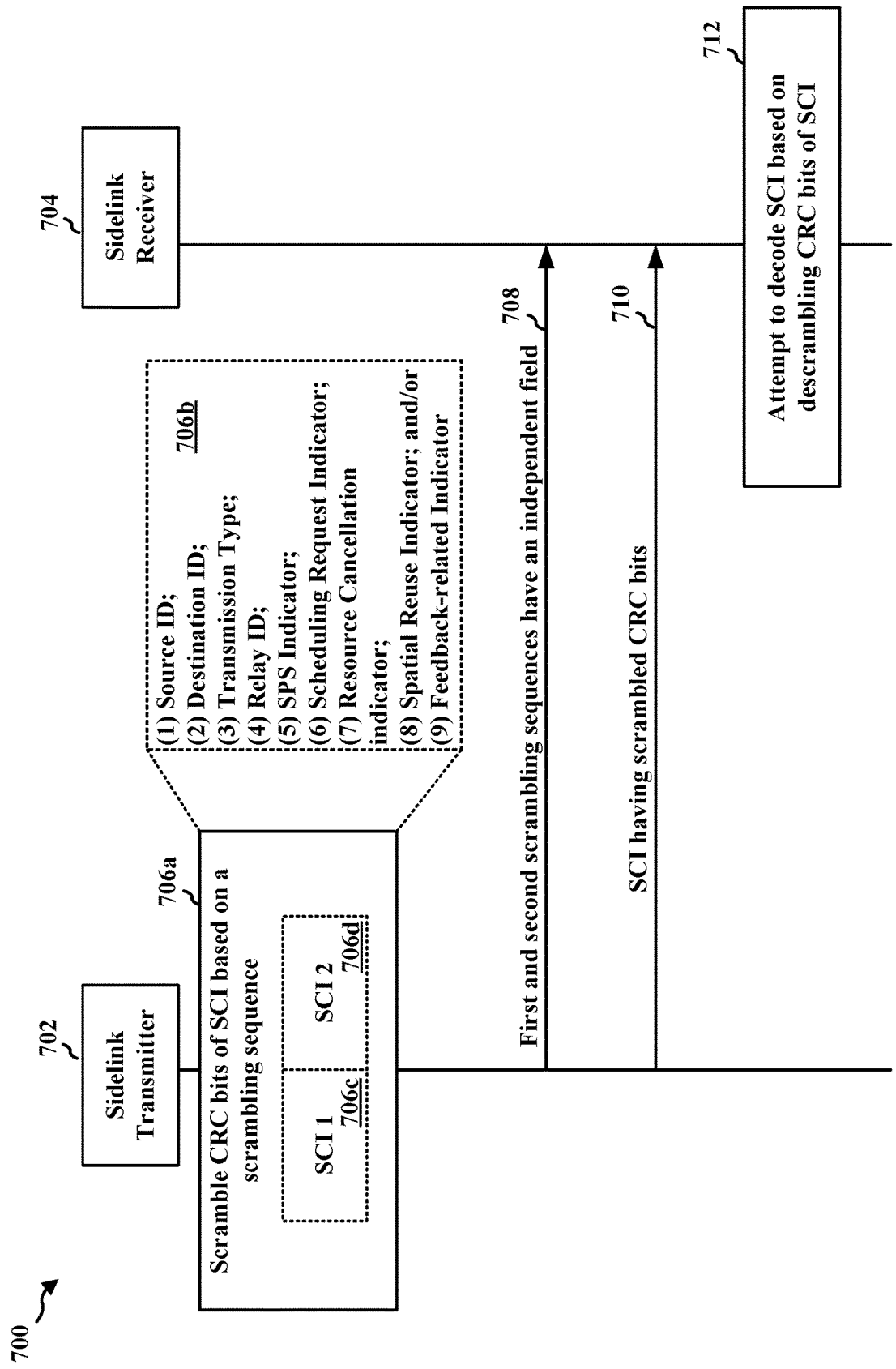
FIG. 7 is a call flow diagram illustrating sidelink communications between a wireless transmitter and a wireless receiver.

FIG. 7 is a call flow diagram 700 illustrating communication between a wireless transmitter 702 and a wireless receiver 704. In some aspects, the wireless transmitter 702 may be a first UE and the wireless receiver 704 may be a second UE, such as described in connection with any of FIG. 1, 3, 4, 5A, or 5B. In some aspects, the wireless transmitter 702 and/or the wireless receiver 704 may be a PLC or S/A, such as described in connection with FIG. 6. In some aspects, one of more of the wireless transmitter 702 and/or the wireless receiver 704 may be an RSU, a base station, or another device communicating based on sidelink. At 706a, the wireless transmitter 702 may scramble CRC bits of SCI based on a scrambling sequence. As indicated via fields 706b, the scrambling sequence may be based on (1) a source ID; (2) a destination ID; (3) a transmission type; (4) a relay ID; (5) an SPS indicator, such as for indicating whether the traffic may be semi-persistent; (6) a scheduling request indicator; (7) a resource cancellation indicator; (8) a spatial reuse indicator; and/or (9) a feedback-related indicator, such as for HARQ-ACK reporting. Further, the SCI may be comprised of SCI 1 706c and SCI 2 706d. The wireless transmitter 702 may scramble, at 706a, CRC bits of the SCI 1 706c to provide a first scrambling sequence and/or CRC bits of the SCI 2 706d to provide a second scrambling sequence.

At 708, the wireless transmitter 702 may provide an indication to the wireless receiver 704 that the first scrambling sequence and the second scrambling sequence include one or more independent fields. For example, the first scrambling sequence for the CRC bits of the SCI 1 706c may be based on any of the fields 706b and the second scrambling sequence for the CRC bits of the SCI 2 may be based on one or more different fields included in the fields 706b that are not used for the first scrambling sequence. At 710, the wireless transmitter 702 may transmit SCI having scrambled CRC bits to the wireless receiver 704. In aspects, the wireless transmitter 702 may separately transmit the SCI 1 706c and the SCI 2 706d to the wireless receiver 704. At 712, the wireless receiver 704 may attempt to decode the SCI (e.g., the SCI 1 706c and/or the SCI 2 706d) based on descrambling the CRC bits of the SCI.

Figure 8:
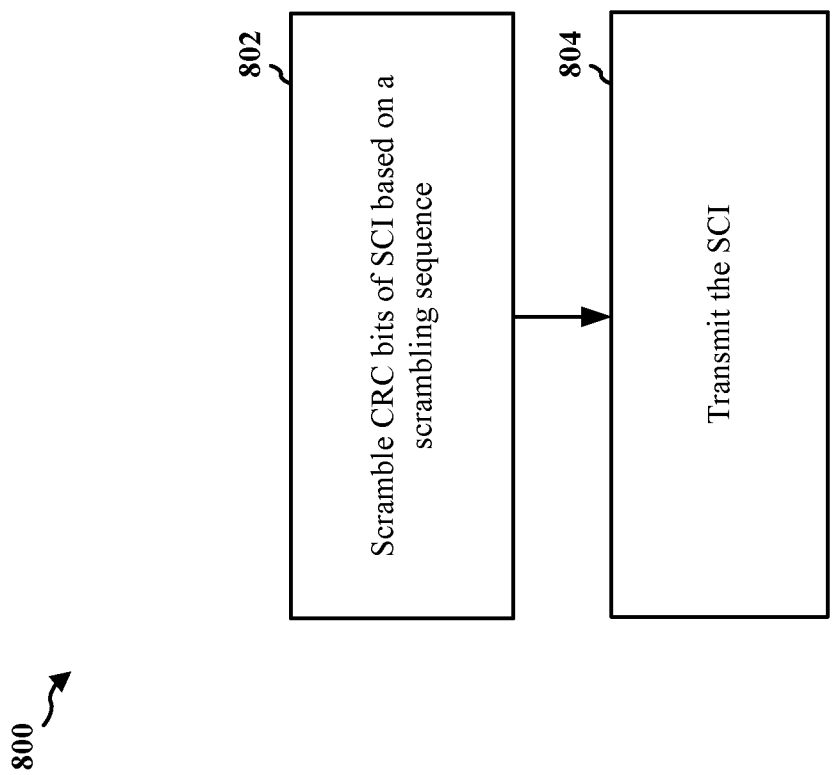
FIG. 8 is a flowchart of a method of wireless communication at a wireless transmitter.

FIG. 8 is a flowchart 800 of a method of wireless communication. The method may be performed by a wireless transmitter/transmitter UE, e.g., the UE 104a, the wireless transmitter 702, the apparatus 1202, etc., which may include the memory 360 and which may be the entire UE 104a, wireless transmitter, 702, apparatus 1202, etc., or a component of the UE 104a, wireless transmitter, 702, apparatus 1202, etc., such as the TX processor 368, the RX processor 356, and/or the controller/processor 359. The method may be performed to improve sidelink communication between sidelink UEs of different UE capabilities.

At 802, the wireless transmitter may scramble CRC bits of SCI based on a scrambling sequence. For example, referring to FIG. 7, the wireless transmitter 702 may scramble, at 706, the CRC bits of the SCI based on the scrambling sequence. The scrambling sequence may be based on at least one of a source identifier (e.g., 706b(1)), a destination identifier (e.g., 706b(2)), a transmission type (e.g., 706b(3)), a relay identifier (e.g., 706b(4)), a SPS indicator (e.g., 706b(5)) such as for indicating whether the traffic may be SPS, a scheduling request indicator (e.g., 706b(6)), a resource cancellation indicator (e.g., 706b(7)), a spatial reuse indicator (e.g., 706b(8)), or a feedback-related indicator (e.g., 706b(9)) such as for HARQ-ACK reporting. The scrambling, at 802, may be performed by the scrambler component 1240 of the apparatus 1202 in FIG. 12.

At 804, the wireless transmitter may transmit the SCI. For example, referring to FIG. 7, the wireless transmitter 702 may transmit, at 710, the SCI having the scrambled CRC bits to the wireless receiver 704. The SCI may include a first portion of SCI (e.g., SCI 1 706c) transmitted in a PSCCH and a second portion of SCI (e.g., SCI 2 706d) transmitted in a PSSCH, where the wireless transmitter 702 may scramble, at 706a, the CRC bits of at least the first portion of the SCI 706c or the second portion of the SCI 706d based on the scrambling sequence. That is, the CRC bits of the first portion of SCI 706c transmitted in the PSCCH may be scrambled with the scrambling sequence and/or the CRC bits of the second portion of SCI 706d transmitted in the PSSCH may be scrambled with the scrambling sequence. The transmission, at 804, may be performed by the transmission component 1234 of the apparatus 1202 in FIG. 12.

Figure 9:
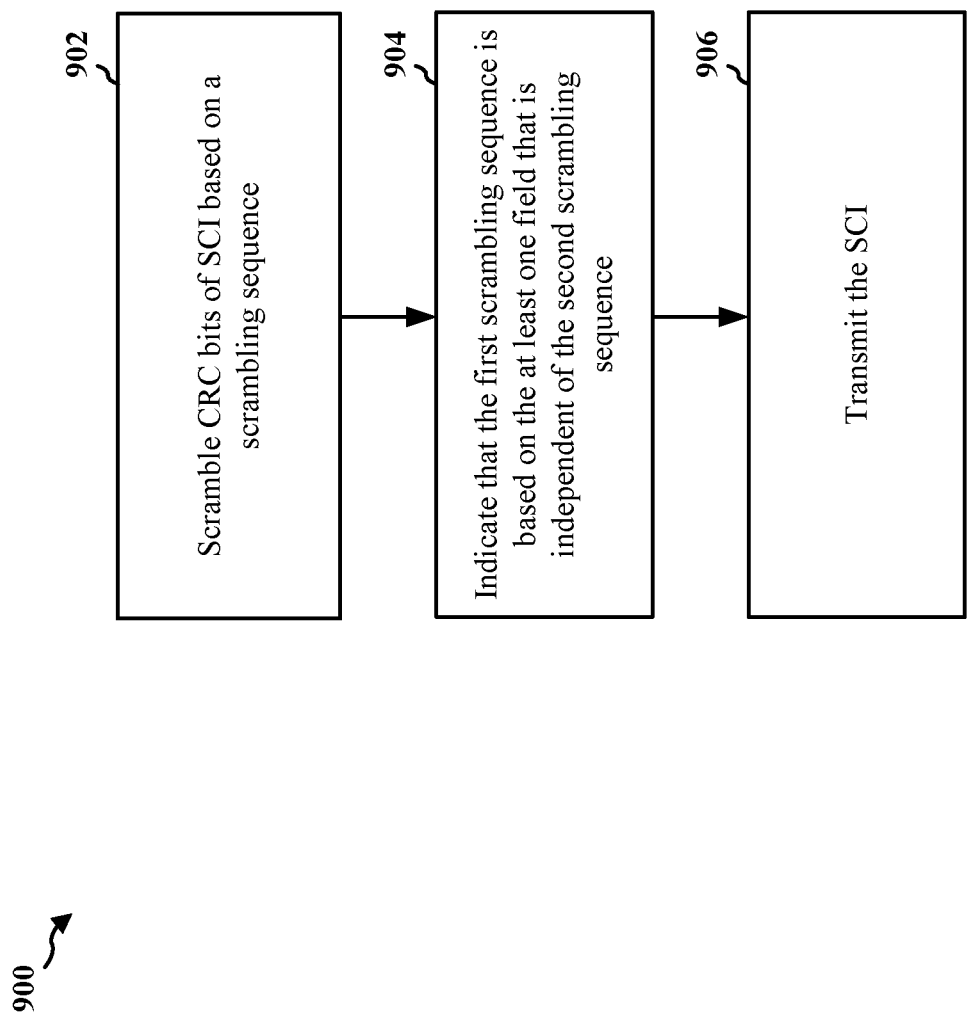
FIG. 9 is a flowchart of a method of wireless communication at a wireless transmitter.

FIG. 9 is a flowchart 900 of a method of wireless communication. The method may be performed by a wireless transmitter/transmitter UE, e.g., the UE 104a, the wireless transmitter 702, the apparatus 1202, etc., which may include the memory 360 and which may be the entire UE 104a, wireless transmitter, 702, apparatus 1202, etc., or a component of the UE 104a, wireless transmitter, 702, apparatus 1202, etc., such as the TX processor 368, the RX processor 356, and/or the controller/processor 359. The method may be performed to improve sidelink communication between sidelink UEs of different UE capabilities.

At 902, the wireless transmitter may scramble CRC bits of SCI based on a scrambling sequence. For example, referring to FIG. 7, the wireless transmitter 702 may scramble, at 706, the CRC bits of the SCI based on the scrambling sequence. The scrambling sequence may be based on at least one of a source identifier (e.g., 706b(1)), a destination identifier (e.g., 706b(2)), a transmission type (e.g., 706b(3)), a relay identifier (e.g., 706b(4)), a SPS indicator (e.g., 706b(5)) such as for indicating whether the traffic may be SPS, a scheduling request indicator (e.g., 706b(6)), a resource cancellation indicator (e.g., 706b(7)), a spatial reuse indicator (e.g., 706b(8)), or a feedback-related indicator (e.g., 706b(9)) such as for HARQ-ACK reporting. The scrambling, at 902, may be performed by the scrambler component 1240 of the apparatus 1202 in FIG. 12.

In a first example, the scrambling sequence may be based on a source identifier (e.g., 706b(1)), a destination identifier (e.g., 706b(2)), and a transmission type (e.g., 706b(3)). In a second example, the scrambling sequence may be based on a source identifier (e.g., 706b(1)), a transmitter identifier (e.g., 706b(4)), or a configured identifier. In a third example, the scrambling sequence may be based on at least one of a destination identifier (e.g., 706b(2)) or a transmission type (e.g., 706b(3)). The scrambling sequence may be further based on a scheduling type or a device type. The scheduling type may be a SPS type or an aperiodic type. The device type may be an anchor device (e.g., 606) or a client device (e.g., 610-614).

The SCI may include a first portion of SCI (e.g., SCI 1 706c) transmitted in a PSCCH and a second portion of SCI (e.g., SCI 2 706d) transmitted in a PSSCH, where the wireless transmitter 702 may scramble, at 706a, the CRC bits of at least the first portion of the SCI 706c or the second portion of the SCI 706d based on the scrambling sequence. That is, the CRC bits of the first portion of SCI 706c transmitted in the PSCCH may be scrambled with the scrambling sequence and/or the CRC bits of the second portion of SCI 706d transmitted in the PSSCH may be scrambled with the scrambling sequence. In some aspects, the first portion of the SCI 706c may not be scrambled.

In configurations, the scrambling sequence may be based on a source identifier (e.g., 706b(1)), a destination identifier (e.g., 706b(2)), or a transmission type (e.g., 706b(3)), where the second portion of the SCI 706d omits the source identifier (e.g., 706b(1)), the destination identifier (e.g., 706b(2)), or the transmission type (e.g., 706b(3)) on which the scrambling sequence of the first portion of the SCI 706c is based. A reduction in the payload size of the second portion of the SCI 706d may be indicted by a format of the second portion of the SCI 706d. In further configurations, the scrambling sequence may be based on a source identifier (e.g., 706b(1)), a destination identifier (e.g., 706b(2)), or a transmission type (e.g., 706b(3)), where the second portion of the SCI 706d includes a different indicator for the source, the destination, or the transmission type. In still further configurations, the scrambling sequence may be based on a source identifier (e.g., 706b(1)), a destination identifier (e.g., 706b(2)), or a transmission type (e.g., 706b(3)), where the second portion of the SCI 706d includes the source identifier (e.g., 706b(1)), the destination identifier (e.g., 706b(2)), or the transmission type (e.g., 706b(3)). The source identifier (e.g., 706b(1)), the destination identifier (e.g., 706b(2)), or the transmission type (e.g., 706b(3)) on which the scrambling sequence of the first portion of the SCI 706c is based may be different than the source identifier (e.g., 706b(1)), the destination identifier (e.g., 706b(2)), or the transmission type (e.g., 706b(3)) included in the second portion of the SCI 706d.

At 904, the wireless transmitter may indicate that a first scrambling sequence is based on at least one field that is independent of a second scrambling sequence. For example, referring to FIG. 7, the wireless transmitter 702 may indicate, at 708, to the wireless receiver 704 that the first scrambling sequence and the second scrambling sequence have an independent field. Thus, the first scrambling sequence may be based on at least one field that is independent of the second scrambling sequence. The indication, at 904, may be performed by the indication component 1242 of the apparatus 1202 in FIG. 12.

In examples, the CRC bits of the first portion of the SCI 706c may be scrambled with the first scrambling sequence and the CRC bits of the second portion of the SCI 706d may be scrambled with the second scrambling sequence. The first scrambling sequence may be based on a first subset of parameters including a source identifier (e.g., 706b(1)), a transmitter identifier (e.g., 706b(4)), or a transmission type (e.g., 706b(3)) and the second scrambling sequence may be based on a second subset of the parameters. For instance, the first scrambling sequence may be based on the source ID (e.g., 706b(1)) and the second scrambling sequence may be based on one or more of the destination ID (e.g., 706b(2)) or the transmission type (e.g., 706b(3)). In another example, the first scrambling sequence may be based on the destination ID (e.g., 706b(2)).

In further examples, the first scrambling sequence may be based on one or more of a first set of a first source identifier, a first transmitter identifier, or a first transmission type and the second scrambling sequence may be based on one or more of a second source identifier, a second transmitter identifier, or a second transmission type. For instance, the first scrambling sequence may be based on a different destination ID (e.g., 706b(2)) than the second scrambling sequence and/or the first scrambling sequence may be based on a different source ID (e.g., 706b(1)) than the second scrambling sequence.

At 906, the wireless transmitter may transmit the SCI. For example, referring to FIG. 7, the wireless transmitter 702 may transmit, at 710, the SCI having the scrambled CRC bits to the wireless receiver 704. The transmission, at 906, may be performed by the transmission component 1234 of the apparatus 1202 in FIG. 12.

Figure 10:
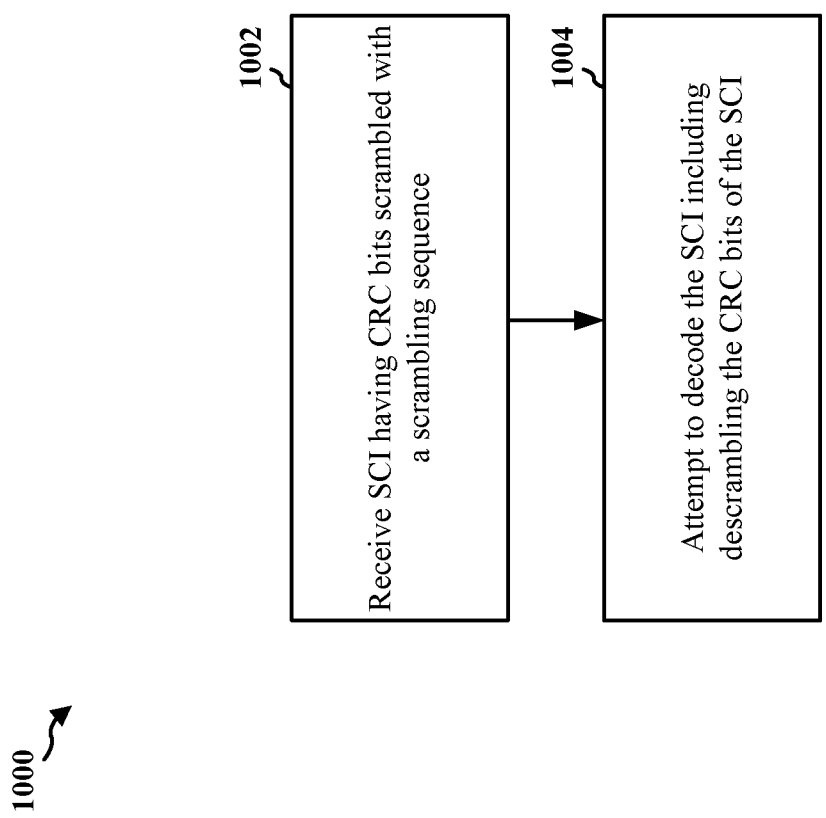
FIG. 10 is a flowchart of a method of wireless communication at a wireless receiver.

FIG. 10 is a flowchart 1000 of a method of wireless communication. The method may be performed by a wireless receiver/receiver UE, e.g., the UE 104b, the wireless receiver 704, the apparatus 1202, etc., which may include the memory 376 and which may be the entire UE 104b, wireless receiver 704, apparatus 1202, etc., or a component of the UE 104b, wireless receiver 704, apparatus 1202, etc., such as the TX processor 316, the RX processor 370, and/or the controller/processor 375. The method may be performed to improve sidelink communication between sidelink UEs of different UE capabilities.

At 1002, the wireless receiver may receive SCI having CRC bits scrambled with a scrambling sequence. For example, referring to FIG. 7, the wireless receiver 704 may receive, at 710, SCI having scrambled CRC bits from the wireless transmitter 702. The scrambling sequence may be based on at least one of a source identifier (e.g., 706b(1)), a destination identifier (e.g., 706b(2)), a transmission type (e.g., 706b(3)), a relay identifier (e.g., 706b(4)), a SPS indicator (e.g., 706b(5)) such as for indicating whether the traffic may be SPS, a scheduling request indicator (e.g., 706b(6)), a resource cancellation indicator (e.g., 706b(7)), a spatial reuse indicator (e.g., 706b(8)), or a feedback-related indicator (e.g., 706b(9)) such as for HARQ-ACK reporting. The reception, at 1002, may be performed by the reception component 1230 of the apparatus 1202 in FIG. 12.

At 1004, the wireless receiver may attempt to decode the SCI including descrambling the CRC bits of the SCI. For example, referring to FIG. 7, the wireless receiver 704 may attempt, at 712, to decode the SCI based on descrambling the CRC bits of the SCI received, at 710. The SCI may include a first portion of SCI 706c received in a PSCCH and a second portion of SCI 706d received in a PSSCH, where the wireless receiver 704 may descramble the CRC bits of at least the first portion of the SCI 706c or the second portion of the SCI 706d based on the scrambling sequence. That is, the CRC bits of the first portion of SCI 706c received in the PSCCH may be scrambled with the scrambling sequence and/or the CRC bits of the second portion of SCI 706d received in the PSSCH may be scrambled with the scrambling sequence. The attempt to decode, at 1004, may be performed by the attempt component 1244 of the apparatus 1202 in FIG. 12.

Figure 11:
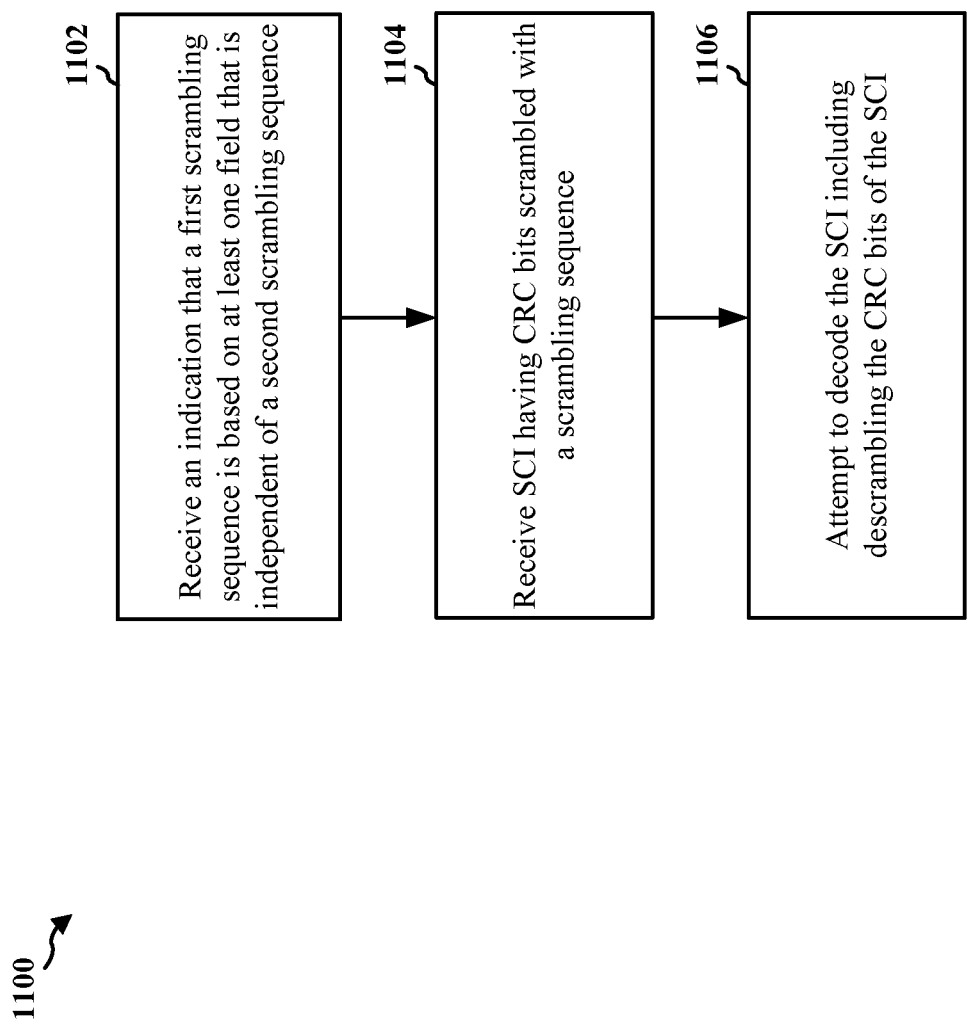
FIG. 11 is a flowchart of a method of wireless communication at a wireless receiver.

FIG. 11 is a flowchart 1100 of a method of wireless communication. The method may be performed by a wireless receiver/receiver UE, e.g., the UE 104b, the wireless receiver 704, the apparatus 1202, etc., which may include the memory 376 and which may be the entire UE 104b, wireless receiver 704, apparatus 1202, etc., or a component of the UE 104b, wireless receiver 704, apparatus 1202, etc., such as the TX processor 316, the RX processor 370, and/or the controller/processor 375. The method may be performed to improve sidelink communication between sidelink UEs of different UE capabilities.

At 1102, the wireless receiver may receive an indication that a first scrambling sequence is based on at least one field that is independent of a second scrambling sequence. For example, referring to FIG. 7, the wireless receiver 704 may receive, at 708, an indication from the wireless transmitter 702 that a first scrambling sequence and a second scrambling sequence have an independent field. Thus, the first scrambling sequence may be based on at least one field that is independent of the second scrambling sequence. The reception, at 1102, may be performed by the reception component 1230 of the apparatus 1202 in FIG. 12.

In examples, CRC bits of a first portion of SCI (e.g., SCI 1 706c) may be scrambled with a first scrambling sequence and CRC bits of a second portion of the SCI (e.g., SCI 2 706d) may be scrambled with a second scrambling sequence. The first scrambling sequence may be based on a first subset of parameters including a source identifier (e.g., 706b(1)), a transmitter identifier (e.g., 706b(4)), or a transmission type (e.g., 706b(3)) and the second scrambling sequence may be based on a second subset of the parameters. For instance, the first scrambling sequence may be based on the source ID (e.g., 706b(1)) and the second scrambling sequence may be based on one or more of the destination ID (e.g., 706b(2)) or the transmission type (e.g., 706b(3)). In another example, the first scrambling sequence may be based on the destination ID (e.g., 706b(2)).

In further examples, the first scrambling sequence may be based on one or more of a first set of a first source identifier, a first transmitter identifier, or a first transmission type and the second scrambling sequence may be based on one or more of a second source identifier, a second transmitter identifier, or a second transmission type. For instance, the first scrambling sequence may be based on a different destination ID (e.g., 706b(2)) than the second scrambling sequence and/or the first scrambling sequence may be based on a different source ID (e.g., 706b(1)) than the second scrambling sequence.

At 1104, the wireless receiver may receive SCI having CRC bits scrambled with a scrambling sequence. For example, referring to FIG. 7, the wireless receiver 704 may receive, at 710, SCI having scrambled CRC bits from the wireless transmitter 702. The scrambling sequence may be based on at least one of a source identifier (e.g., 706b(1)), a destination identifier (e.g., 706b(2)), a transmission type (e.g., 706b(3)), a relay identifier (e.g., 706b(4)), a SPS indicator (e.g., 706b(5)) such as for indicating whether the traffic may be SPS, a scheduling request indicator (e.g., 706b(6)), a resource cancellation indicator (e.g., 706b(7)), a spatial reuse indicator (e.g., 706b(8)), or a feedback-related indicator (e.g., 706b(9)) such as for HARQ-ACK reporting. The reception, at 1104, may be performed by the reception component 1230 of the apparatus 1202 in FIG. 12.

In a first example, the scrambling sequence may be based on a source identifier (e.g., 706b(1)), a destination identifier (e.g., 706b(2)), and a transmission type (e.g., 706b(3)). In a second example, the scrambling sequence may be based on a source identifier (e.g., 706b(1)), a transmitter identifier (e.g., 706b(4)), or a configured identifier. In a third example, the scrambling sequence may be based on at least one of a destination identifier (e.g., 706b(2)) or a transmission type (e.g., 706b(3)). The scrambling sequence may be further based on a scheduling type or a device type. The scheduling type may be a SPS type or an aperiodic type. The device type may be an anchor device (e.g., 606) or a client device (e.g., 610-614).

The SCI may include a first portion of SCI 706c received in a PSCCH and a second portion of SCI 706d received in a PSSCH, where the wireless receiver 704 may descramble the CRC bits of at least the first portion of the SCI 706c or the second portion of the SCI 706d based on the scrambling sequence. That is, the CRC bits of the first portion of SCI 706c received in the PSCCH may be scrambled with the scrambling sequence and/or the CRC bits of the second portion of SCI 706d received in the PSSCH may be scrambled with the scrambling sequence. In some aspects, the first portion of the SCI 706c may not be scrambled.

In configurations, the scrambling sequence may be based on a source identifier (e.g., 706b(1)), a destination identifier (e.g., 706b(2)), or a transmission type (e.g., 706b(3)), where the second portion of the SCI 706d omits the source identifier (e.g., 706b(1)), the destination identifier (e.g., 706b(2)), or the transmission type (e.g., 706b(3)) on which the scrambling sequence of the first portion of the SCI 706c is based. A reduction in the payload size of the second portion of the SCI 706d may be indicted by a format of the second portion of the SCI 706d. In further configurations, the scrambling sequence may be based on a source identifier (e.g., 706b(1)), a destination identifier (e.g., 706b(2)), or a transmission type (e.g., 706b(3)), where the second portion of the SCI 706d includes a different indicator for the source, the destination, or the transmission type. In still further configurations, the scrambling sequence may be based on a source identifier (e.g., 706b(1)), a destination identifier (e.g., 706b(2)), or a transmission type (e.g., 706b(3)), where the second portion of the SCI 706d includes the source identifier (e.g., 706b(1)), the destination identifier (e.g., 706b(2)), or the transmission type (e.g., 706b(3)). The source identifier (e.g., 706b(1)), the destination identifier (e.g., 706b(2)), or the transmission type (e.g., 706b(3)) on which the scrambling sequence of the first portion of the SCI 706c is based may be different than the source identifier (e.g., 706b(1)), the destination identifier (e.g., 706b(2)), or the transmission type (e.g., 706b(3)) included in the second portion of the SCI 706d.

At 1106, the wireless receiver may attempt to decode the SCI including descrambling the CRC bits of the SCI. For example, referring to FIG. 7, the wireless receiver 704 may attempt, at 712, to decode the SCI based on descrambling the CRC bits of the SCI received, at 710. The attempt to decode, at 1106, may be performed by the attempt component 1244 of the apparatus 1202 in FIG. 12.

Figure 12:
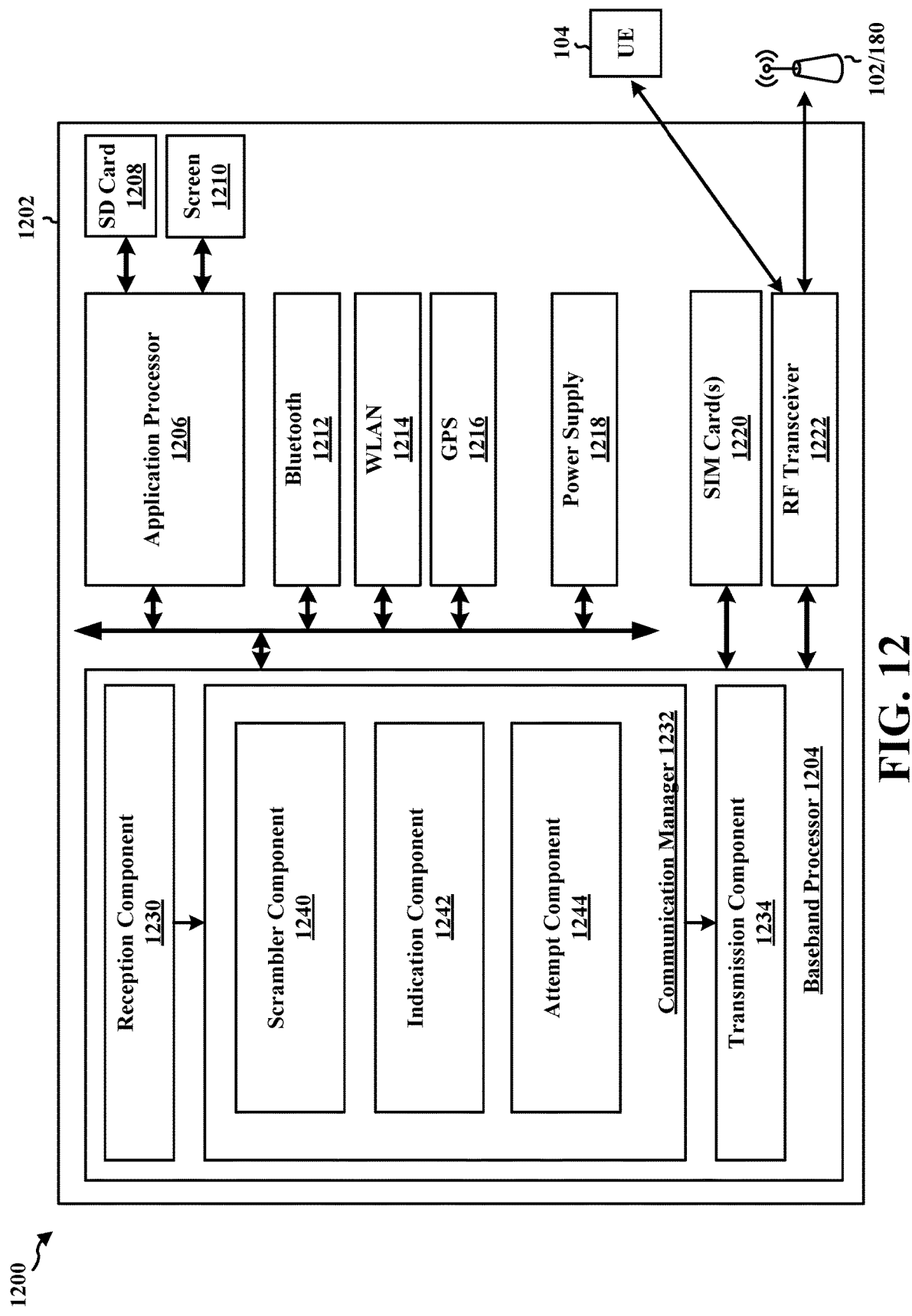
FIG. 12 is a diagram illustrating an example of a hardware implementation for an example apparatus.

FIG. 12 is a diagram 1200 illustrating an example of a hardware implementation for an apparatus 1202. In some aspects, the apparatus 1202 may be a UE, a component of a UE, or may implement UE functionality. The UE may correspond to the transmitter 702. The UE may correspond to the receiver 704. As a UE may operate as both a transmitter and a receiver, the apparatus 1202 may include components configured to perform the aspects of the transmitter 702, e.g., when transmitting sidelink communication, and may include components to perform the aspects of the receiver 704, e.g., when receiving sidelink communication. In some aspects, the apparatus 1202 may include a baseband processor 1204 (also referred to as a modem) coupled to an RF transceiver 1222. The baseband processor 1204 may be a cellular baseband processor, in some aspects, and the RF transceiver 1222 may be a cellular RF transceiver. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and/or a power supply 1218. The baseband processor 1204 communicates through the RF transceiver 1222 with the UE 104 and/or BS 102/180. The baseband processor 1204 may include a computer-readable medium/memory. The computer-readable medium/memory may be non-transitory. The baseband processor 1204 is responsible for general processing, including the execution of software stored on the computer-readable medium/memory. The software, when executed by the baseband processor 1204, causes the baseband processor 1204 to perform the various functions described supra. The computer-readable medium/memory may also be used for storing data that is manipulated by the baseband processor 1204 when executing software. The baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband processor 1204. The baseband processor 1204 may be a component of the device 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The reception component 1230 may be configured, e.g., as described in connection with 902 and 904, to receive an indication that a first scrambling sequence is based on at least one field that is independent of a second scrambling sequence; and to receive SCI having CRC bits scrambled with a scrambling sequence. The communication manager 1232 includes a scrambler component 1240 that is configured, e.g., as described in connection with 802, to scramble CRC bits of SCI based on a scrambling sequence. The communication manager 1232 further includes an indication component 1242 that is configured, e.g., as described in connection with 804, to indicate that the first scrambling sequence is based on the at least one field that is independent of the second scrambling sequence. The communication manager 1232 further includes an attempt component 1244 that is configured, e.g., as described in connection with 906, to attempt to decode the SCI including descrambling the CRC bits of the SCI. The transmission component 1234 may be configured, e.g., as described in connection with 806, to transmit the SCI.

The apparatus may include additional components that perform each of the blocks of the algorithm in the flowcharts of FIGS. 8-9, and/or the aspects performed by a UE in FIG. 7. As such, each block in the flowcharts of FIGS. 8-9, and/or the aspects performed by a UE in FIG. 7, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband processor 1204, may include means for scrambling CRC bits of SCI based on a scrambling sequence; and means for transmitting the SCI. The apparatus 1202 may further includes means for indicating that the first scrambling sequence is based on the at least one field that is independent of the second scrambling sequence. The apparatus 1202 may include means for receiving SCI having CRC bits scrambled with a scrambling sequence; and means for attempting to decode the SCI including descrambling the CRC bits of the SCI. The apparatus 1202 may further includes means for receiving an indication that the first scrambling sequence is based on the at least one field that is independent of the second scrambling sequence. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a wireless transmitter including at least one processor coupled to a memory and configured to scramble CRC bits of SCI based on a scrambling sequence; and transmit the SCI.

Aspect 2 may be combined with aspect 1 and includes that the SCI includes a first portion of SCI transmitted in a PSCCH and a second portion of SCI transmitted in a PSSCH, wherein the wireless transmitter scrambles the CRC bits of at least the first portion of the SCI or the second portion of the SCI based on the scrambling sequence.

Aspect 3 may be combined with any of aspects 1-2 and includes that the scrambling sequence is based on at least one of a source identifier, a destination identifier, a transmission type, a relay identifier, a SPS indicator, a scheduling request indicator, a resource cancellation indicator, a spatial reuse indicator, or a feedback-related indicator.

Aspect 4 may be combined with any of aspects 1-3 and includes that the scrambling sequence is further based on a scheduling type or a device type.

Aspect 5 may be combined with any of aspects 1-4 and includes that the scheduling type is a SPS type or an aperiodic type.

Aspect 6 may be combined with any of aspects 1-5 and includes that the device type is an anchor device or a client device.

Aspect 7 may be combined with any of aspects 1-6 and includes that the CRC bits of a first portion of SCI transmitted in a PSCCH are scrambled with the scrambling sequence.

Aspect 8 may be combined with any of aspects 1-7 and includes that the scrambling sequence is based on a source identifier, a destination identifier, and a transmission type.

Aspect 9 may be combined with any of aspects 1-7 and includes that the scrambling sequence is based on a source identifier, a transmitter identifier, or a configured identifier.

Aspect 10 may be combined with any of aspects 1-7 and includes that the scrambling sequence is based on at least one of a destination identifier or a transmission type.

Aspect 11 may be combined with any of aspects 1-7 and includes that the scrambling sequence is based on a source identifier, a destination identifier, or a transmission type, and wherein a second portion of the SCI omits the source identifier, the destination identifier, or the transmission type on which the scrambling sequence of the first portion of the SCI is based.

Aspect 12 may be combined with any of aspects 1-7 or 11 and includes that a reduction in the payload size of the second portion of the SCI is indicted by a format of the second portion of the SCI.

Aspect 13 may be combined with any of aspects 1-7 and includes that the scrambling sequence is based on a source identifier, a destination identifier, or a transmission type, and wherein a second portion of the SCI includes a different indicator for the source, the destination, or the transmission type.

Aspect 14 may be combined with any of aspects 1-7 and includes that the scrambling sequence is based on a source identifier, a destination identifier, or a transmission type, and wherein a second portion of the SCI includes the source identifier, the destination identifier, or the transmission type.

Aspect 15 may be combined with any of aspects 1-7 or 14 and includes that the source identifier, the destination identifier, or the transmission type on which the scrambling sequence of the first portion of the SCI is based is different than the source identifier, the destination identifier, or the transmission type included in the second portion of the SCI.

Aspect 16 may be combined with any of aspects 1-15 and includes that the CRC bits of a second portion of SCI transmitted in a PSSCH are scrambled with the scrambling sequence.

Aspect 17 may be combined with any of aspects 1-6 or 16 and includes that the first portion of the SCI is not scrambled.

Aspect 18 may be combined with any of aspects 1-16 and includes that the CRC bits of a first portion of the SCI are scrambled with a first scrambling sequence and the CRC bits of a second portion of the SCI are scrambled with a second scrambling sequence.

Aspect 19 may be combined with any of aspects 1-16 or 18 and includes that the first scrambling sequence is based on a first subset of parameters including a source identifier, a transmitter identifier, or a transmission type, and wherein the second scrambling sequence is based on a second subset of the parameters.

Aspect 20 may be combined with any of aspects 1-16 or 18-19 and includes that the first scrambling sequence is based on the source ID and the second scrambling sequence is based on one or more of the destination ID or the transmission type.

Aspect 21 may be combined with any of aspects 1-16 or 18-20 and includes that the first scrambling sequence is based on the destination ID.

Aspect 22 may be combined with any of aspects 1-16 or 18-21 and includes that the first scrambling sequence is based on at least one field that is independent of the second scrambling sequence.

Aspect 23 may be combined with any of aspects 1-16 or 18-22 and includes that the first scrambling sequence is based on one or more of a first set of a first source identifier, a first transmitter identifier, or a first transmission type, and wherein the second scrambling sequence is based on one or more of a second source identifier, a second transmitter identifier, or a second transmission type.

Aspect 24 may be combined with any of aspects 1-16 or 18-23 and includes that the first scrambling sequence is based on a different destination ID than the second scrambling sequence.

Aspect 25 may be combined with any of aspects 1-16 or 18-24 and includes that the first scrambling sequence is based on a different source ID than the second scrambling sequence.

Aspect 26 may be combined with any of aspects 1-16 or 18-25 and includes that the at least one processor is further configured to indicate that the first scrambling sequence is based on the at least one field that is independent of the second scrambling sequence.

Aspect 27 is an apparatus for wireless communication at a wireless receiver including at least one processor coupled to a memory and configured to: receive SCI having CRC bits scrambled with a scrambling sequence; and attempt to decode the SCI including descrambling the CRC bits of the SCI.

Aspect 28 may be combined with aspect 27 and includes that the SCI includes a first portion of SCI received in a PSCCH and a second portion of SCI received in a PSSCH, wherein the wireless receiver descrambles the CRC bits of at least the first portion of the SCI or the second portion of the SCI based on the scrambling sequence.

Aspect 29 may be combined with any of aspects 27-28 and includes that the scrambling sequence is based on at least one of a source identifier, a destination identifier, a transmission type, a relay identifier, an SPS indicator, a scheduling request indicator, a resource cancellation indicator, a spatial reuse indicator, or a feedback-related indicator.

Aspect 30 may be combined with any of aspects 27-29 and includes that the scrambling sequence is further based on a scheduling type or a device type.

Aspect 31 may be combined with any of aspects 27-30 and includes that the scheduling type is a SPS type or an aperiodic type.

Aspect 32 may be combined with any of aspects 27-31 and includes that the device type is an anchor device or a client device.

Aspect 33 may be combined with any of aspects 27-32 and includes that the CRC bits of a first portion of SCI received in a PSCCH are scrambled with the scrambling sequence.

Aspect 34 may be combined with any of aspects 27-33 and includes that the scrambling sequence is based on a source identifier, a destination identifier, and a transmission type.

Aspect 35 may be combined with any of aspects 27-33 and includes that the scrambling sequence is based on a source identifier, a transmitter identifier, or a configured identifier.

Aspect 36 may be combined with any of aspects 27-33 and includes that the scrambling sequence is based on at least one of a destination identifier or a transmission type.

Aspect 37 may be combined with any of aspects 27-33 and includes that the scrambling sequence is based on a source identifier, a destination identifier, or a transmission type, and wherein a second portion of the SCI omits the source identifier, the destination identifier, or the transmission type on which the scrambling sequence of the first portion of the SCI is based.

Aspect 38 may be combined with any of aspects 27-33 or 37 and includes that a reduction in the payload size of the second portion of the SCI is indicted by a format of the second portion of the SCI.

Aspect 39 may be combined with any of aspects 27-33 and includes that the scrambling sequence is based on a source identifier, a destination identifier, or a transmission type, and wherein a second portion of the SCI includes a different indicator for the source, the destination, or the transmission type.

Aspect 40 may be combined with any of aspects 27-33 and includes that the scrambling sequence is based on a source identifier, a destination identifier, or a transmission type, and wherein a second portion of the SCI includes the source identifier, the destination identifier, or the transmission type.

Aspect 41 may be combined with any of aspects 27-33 or 40 and includes that the source identifier, the destination identifier, or the transmission type on which the scrambling sequence of the first portion of the SCI is based is different than the source identifier, the destination identifier, or the transmission type included in the second portion of the SCI.

Aspect 42 may be combined with any of aspects 27-41 and includes that the CRC bits of a second portion of SCI received in a PSSCH are scrambled with the scrambling sequence.

Aspect 43 may be combined with any of aspects 27-32 or 42 and includes that the first portion of the SCI is not scrambled.

Aspect 44 may be combined with any of aspects 27-42 and includes that the CRC bits of a first portion of the SCI are scrambled with a first scrambling sequence and the CRC bits of a second portion of the SCI are scrambled with a second scrambling sequence.

Aspect 45 may be combined with any of aspects 27-42 or 44 and includes that the first scrambling sequence is based on a first subset of parameters including a source identifier, a transmitter identifier, or a transmission type, and wherein the second scrambling sequence is based on a second subset of the parameters.

Aspect 46 may be combined with any of aspects 27-42 or 44-45 and includes that the first scrambling sequence is based on the source ID and the second scrambling sequence is based on one or more of the destination ID or the transmission type.

Aspect 47 may be combined with any of aspects 27-42 or 44-46 and includes that the first scrambling sequence is based on the destination ID.

Aspect 48 may be combined with any of aspects 27-42 or 44-47 and includes that the first scrambling sequence is based on at least one field that is independent of the second scrambling sequence.

Aspect 49 may be combined with any of aspects 27-42 or 44-48 and includes that the first scrambling sequence is based on one or more of a first set of a first source identifier, a first transmitter identifier, or a first transmission type, and wherein the second scrambling sequence is based on one or more of a second source identifier, a second transmitter identifier, or a second transmission type.

Aspect 50 may be combined with any of aspects 27-42 or 44-49 and includes that the first scrambling sequence is based on a different destination ID than the second scrambling sequence.

Aspect 51 may be combined with any of aspects 27-42 or 44-50 and includes that the first scrambling sequence is based on a different source ID than the second scrambling sequence.

Aspect 52 may be combined with any of aspects 27-42 or 44-51 and includes that the at least one processor is further configured to receive an indication that the first scrambling sequence is based on the at least one field that is independent of the second scrambling sequence.

Aspect 53 may be combined with any of aspects 1-52 and further includes a transceiver coupled to the at least one processor.

Aspect 54 is a method of wireless communication for implementing any of aspects 1-53.

Aspect 55 is an apparatus for wireless communication including means for implementing any of aspects 1-53.

Aspect 56 is a computer-readable medium storing computer executable code, the code when executed by at least one processor causes the at least one processor to implement any of aspects 1-53.

What is claimed is:

1. An apparatus for wireless communication at a wireless transmitter, comprising:
   memory; and
   at least one processor coupled to the memory and configured to:
   scramble cyclic redundancy check (CRC) bits of at least one of a first portion of sidelink control information (SCI) or a second portion of the SCI based on a scrambling sequence, wherein the scrambling sequence is based on a combination of a cast type, a source identifier of the wireless transmitter and a destination identifier of a wireless receiver, wherein the source identifier of the wireless transmitter comprises a layer 1 (L1) source identifier, and wherein the destination identifier of the wireless receiver comprises an L1 destination identifier; and transmit the first portion of the SCI in a physical sidelink control channel (PSCCH) and the second portion of the SCI in a physical sidelink shared channel (PSSCH), wherein the second portion of the SCI omits one or more of the source identifier, the destination identifier, or the cast type on which the scrambling sequence of the first portion of the SCI is based.

2. The apparatus of claim 1, wherein the scrambling sequence is further based on at least one of a transmission type, a relay identifier, a semi-persistent scheduling (SPS) indicator, a scheduling request indicator, a resource cancellation indicator, a spatial reuse indicator, or a feedback-related indicator.

3. The apparatus of claim 2, wherein the scrambling sequence is further based on a device type being an anchor device or a client device.

4. The apparatus of claim 1, wherein to scramble the CRC bits of at least one of the first portion of the SCI or the second portion of the SCI, the at least one processor is configured to scramble first CRC bits of the first portion of the SCI.

5. The apparatus of claim 1, wherein a reduction in a payload size of the second portion of the SCI is indicated by a format of the second portion of the SCI, wherein the reduction in the payload size is based on an omission of the one or more of the source identifier, the destination identifier, or the cast type.

6. The apparatus of claim 4, wherein at least one of the source identifier, the destination identifier, or the cast type on which the scrambling sequence of the first portion of the SCI is based is different than at least one of the source identifier, the destination identifier, or the cast type included in the second portion of the SCI.

7. The apparatus of claim 4, wherein to scramble the CRC bits of at least one of the first portion of the SCI or the second portion of the SCI, the at least one processor is configured to scramble second CRC bits of the second portion of the SCI.

8. The apparatus of claim 7, wherein to scramble the CRC bits of at least one of the first portion of the SCI or the second portion of the SCI, the at least one processor is configured to not scramble the first portion of the SCI.

9. The apparatus of claim 7, wherein to scramble the CRC bits of at least one of the first portion of the SCI or the second portion of the SCI, the at least one processor is configured to scramble the first CRC bits of the first portion of the SCI with a first scrambling sequence and the second CRC bits of the second portion of the SCI with a second scrambling sequence, the first scrambling sequence based on a first set of parameters including the source identifier, a transmitter identifier, or the cast type, the second scrambling sequence based on a second set of parameters, wherein the first set of parameters is different than the second set of parameters.

10. The apparatus of claim 9, wherein the first scrambling sequence is based on at least one of:
the destination identifier, or the source identifier, the second scrambling sequence based on one or more of the destination identifier or the cast type when the first scrambling sequence is based on the source identifier.

11. The apparatus of claim 9, wherein the first scrambling sequence is based on one or more fields that are independent of the second scrambling sequence.

12. The apparatus of claim 11, wherein the first scrambling sequence is based on at least one of a different destination identifier than the second scrambling sequence or a different source identifier than the second scrambling sequence.

13. The apparatus of claim 9, wherein the at least one processor is further configured to indicate that the first scrambling sequence is based on at least one field that is independent of the second scrambling sequence.

14. An apparatus for wireless communication at a wireless receiver, comprising:
memory; and
at least one processor coupled to the memory and configured to:
receive a first portion of sidelink control information (SCI) in a physical sidelink control channel (PSCCH) and a second portion of the SCI in a physical sidelink shared channel (PSSCH), wherein the SCI includes cyclic redundancy check (CRC) bits scrambled with a scrambling sequence, wherein the scrambling sequence is based on a combination of a cast type, a source identifier of a wireless transmitter and a destination identifier of the wireless receiver, wherein the source identifier of the wireless transmitter comprises a layer 1 (L1) source identifier, and wherein the destination identifier of the wireless receiver comprises an L1 destination identifier; and
attempt to decode the SCI via the at least one processor being configured to descramble the CRC bits of at least the first portion of the SCI or the second portion of the SCI based on the scrambling sequence, wherein the second portion of the SCI omits one or more of the source identifier, the destination identifier, or the cast type on which the scrambling sequence of the first portion of the SCI is based.

15. The apparatus of claim 14, wherein the scrambling sequence is based on at least one of the source identifier, the destination identifier, a transmission type, a relay identifier, a semi-persistent scheduling (SPS) indicator, a scheduling request indicator, a resource cancellation indicator, a spatial reuse indicator, or a feedback-related indicator.

16. The apparatus of claim 15, wherein the scrambling sequence is further based on a device type being an anchor device or a client device.

17. The apparatus of claim 14, wherein first CRC bits of the first portion of the SCI received in the PSCCH have been scrambled with the scrambling sequence.

18. The apparatus of claim 14, wherein a reduction in a payload size of the second portion of the SCI is indicated by a format of the second portion of the SCI, wherein the reduction in the payload size is based on an omission of the one or more of the source identifier, the destination identifier, or the cast type.

19. The apparatus of claim 17, wherein at least one of the source identifier, the destination identifier, or the cast type on which the scrambling sequence of the first portion of the SCI is based is different than at least one of the source identifier, the destination identifier, or the cast type included in the second portion of the SCI.

20. The apparatus of claim 17, wherein second CRC bits of the second portion of the SCI received in the PSSCH have been scrambled with the scrambling sequence.

21. The apparatus of claim 20, wherein the first portion of the SCI is not scrambled.

22. The apparatus of claim 20, wherein the first CRC bits of the first portion of the SCI are scrambled with a first scrambling sequence and the second CRC bits of the second portion of the SCI are scrambled with a second scrambling sequence, the first scrambling sequence based on a first set of parameters including the source identifier, a transmitter identifier, or the cast type, the second scrambling sequence based on a second set of parameters, wherein the first set of parameters is different than the second set of parameters.

23. The apparatus of claim 22, wherein the first scrambling sequence is based on at least one of:

the destination identifier, or the source identifier, the second scrambling sequence based on one or more of the destination identifier or the cast type when the first scrambling sequence is based on the source identifier.

24. The apparatus of claim 22, wherein the first scrambling sequence is based on one or more fields that are independent of the second scrambling sequence.

25. The apparatus of claim 24, wherein the first scrambling sequence is based on at least one of a different destination identifier than the second scrambling sequence or a different source identifier than the second scrambling sequence.

26. The apparatus of claim 22, wherein the at least one processor is further configured to receive an indication that the first scrambling sequence is based on at least one field that is independent of the second scrambling sequence.

* * * * *